(12) United States Patent
Li

(10) Patent No.: US 11,804,915 B2
(45) Date of Patent: Oct. 31, 2023

(54) BROADCAST BEAM WEIGHT DETERMINATION METHOD AND DEVICE, NETWORK ELEMENT, AND STORAGE MEDIUM

(71) Applicant: ZTE CORPORATION, Shenzhen (CN)

(72) Inventor: Bin Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 205 days.

(21) Appl. No.: 17/260,528

(22) PCT Filed: Mar. 22, 2019

(86) PCT No.: PCT/CN2019/079320
§ 371 (c)(1),
(2) Date: Jan. 14, 2021

(87) PCT Pub. No.: WO2020/015379
PCT Pub. Date: Jan. 23, 2020

(65) Prior Publication Data
US 2021/0328690 A1   Oct. 21, 2021

(30) Foreign Application Priority Data
Jul. 16, 2018 (CN) .......................... 201810779571.8

(51) Int. Cl.
*H04B 17/15* (2015.01)
*H04B 7/06* (2006.01)
(Continued)

(52) U.S. Cl.
CPC ........... *H04B 17/15* (2015.01); *H04B 7/0634* (2013.01); *H04B 17/336* (2015.01);
(Continued)

(58) Field of Classification Search
CPC .... H04B 17/15; H04B 17/336; H04B 7/0634; H04W 24/02; H04W 24/04; H04W 24/06; H04W 24/10
See application file for complete search history.

(56) References Cited

U.S. PATENT DOCUMENTS 6,556,809 B1 * 4/2003 Gross ................. H04B 7/18532
455/12.1
9,877,332 B1 * 1/2018 Bonn ..................... H04W 72/10
(Continued)

FOREIGN PATENT DOCUMENTS

CN   101848021 A   9/2010
CN   103036603 A   4/2013
(Continued)

OTHER PUBLICATIONS

International Search Report for Application No. PCT/CN2019/079320, dated May 30, 2019, 4 pages.
(Continued)

*Primary Examiner* — Dominic E Rego
(74) *Attorney, Agent, or Firm* — Morgan, Lewis & Bockius LLP

(57) ABSTRACT

Provided are a broadcast beam weight determination method and apparatus, a broadcast beam weight determination network element, a storage medium and a communications system. The broadcast beam weight determination method includes: determining a predicted performance indicator corresponding to a candidate broadcast beam weight combination according to user information of a region; determining a first broadcast beam weight combination corresponding to an optimal predicted performance indicator; and applying the first broadcast beam weight combination.

27 Claims, 9 Drawing Sheets

(51) Int. Cl.
  *H04W 24/02*   (2009.01)
  *H04W 24/04*   (2009.01)
  *H04B 17/336*  (2015.01)
  *H04W 24/06*   (2009.01)
  *H04W 24/10*   (2009.01)

(52) U.S. Cl.
  CPC ........... *H04W 24/02* (2013.01); *H04W 24/04* (2013.01); *H04W 24/06* (2013.01); *H04W 24/10* (2013.01)

(56) References Cited

U.S. PATENT DOCUMENTS

| | | | | |
|---|---|---|---|---|
| 10,637,544 | B1* | 4/2020 | Shattil | H04B 7/0473 |
| 10,735,984 | B2* | 8/2020 | Carney Landow | H04W 24/02 |
| 10,924,230 | B1* | 2/2021 | Marupaduga | H04L 5/0073 |
| 11,087,261 | B1* | 8/2021 | Basu | G06Q 10/0639 |
| 2008/0273618 | A1* | 11/2008 | Forenza | H04L 27/367 375/261 |
| 2012/0208503 | A1* | 8/2012 | Johansson | H04W 8/04 455/411 |
| 2015/0365143 | A1 | 12/2015 | Chai et al. | |
| 2017/0171912 | A1* | 6/2017 | Ayach | H04L 5/0023 |
| 2017/0237477 | A1* | 8/2017 | Fujio | H04B 7/0617 370/329 |
| 2018/0310311 | A1* | 10/2018 | Li | H04L 5/0023 |
| 2019/0013851 | A1* | 1/2019 | Su | H04B 7/0617 |

FOREIGN PATENT DOCUMENTS

| | | |
|---|---|---|
| CN | 102202330 B | 7/2014 |
| CN | 105375959 A | 3/2016 |
| CN | 105848220 A | 8/2016 |
| CN | 106412973 A | 2/2017 |
| CN | 107947842 A | 4/2018 |
| WO | WO2017/133772 A1 | 8/2017 |

OTHER PUBLICATIONS

Chinese Office Action in application No. 201810779571.8 dated Aug. 1, 2022, 10 pages including translation.
Chinese Search Report in application No. 201810779571.8 dated Jul. 25, 2022, 4 pages including translation.
Dandanov, et al., "Dynamic Self-Optimization of the Antenna Tilt for Best Trade-off Between Coverage and Capacity in Mobile Networks", Wireless Personal Communications, Springer, Dordrecht, NL, vol. 92, No. 1, Oct. 27, 2016 (Oct. 27, 2016), pp. 251-278, XP036116343, ISSN: 0929-6212, DOI: 10.1007/S11277-016-3849-9 [retrieved on Oct. 27, 2016].
Extended European Search Report for Application No. 19836939.9, dated Mar. 17, 2022, 11 pages.
Hoshino et al., "Inter-Cell Interference Coordination by Horizontal Beamforming for Small Cells in 3D Cell Structure", 2015 IEEE Wireless Communications and Networking Conference Workshops (WCNCW), IEEE, Mar. 9, 2015 (Mar. 9, 2015), pp. 364-368, XP032786277, DOI: 10.1109/WCNCW.2015.7122582 [retrieved on Jun. 11, 2015]* p. 364-p. 366; figure 2 *.
Long et al., "Data-Driven-Based Analog Beam Selection for Hybrid Beamforming Under mm-Wave Channels", IEEE Journal of Selected Topics in Signal Processing, IEEE, us, vol. 12, No. 2, May 1, 2018 (May 1, 2018), pp. 340-352, XP011684053, ISSN: 1932-4553, DOI: 10.1109/JSTSP.2018.2818649 [retrieved on May 23, 2018] * p. 345 *.

* cited by examiner

BROADCAST BEAM WEIGHT DETERMINATION METHOD AND DEVICE, NETWORK ELEMENT, AND STORAGE MEDIUM

CROSS-REFERENCES TO RELATED APPLICATIONS

This is a National Stage Application, filed under 35 U.S.C. 371, of International Patent Application No. PCT/CN2019/079320, filed on Mar. 22, 2019, which is based on and claims priority to Chinese Patent Application No. 201810779571.8 filed on Jul. 16, 2018, the disclosure of which is incorporated herein by reference in its entirety.

TECHNICAL FIELD

The present disclosure relates to, but is not limited to, the field of communications, and in particular, relates to a broadcast beam weight determination method and apparatus, a broadcast beam weight determination network element, a storage medium and a communications system.

BACKGROUND

In the field of communications, multi-antenna device (e.g. antenna array) is introduced in broadcast beam weight determination network elements (e.g. base station) with the introduction of beam forming (BF) technology. Through the multi-antenna and BF technology, the quality of the signal received at a receiving terminal, such as the signal-to-noise ratio of the received signal, can be greatly improved, and multi-reuse such as spatial multiplexing of communications resources such as time-frequency resources can be achieved. Thus, not only the signal quality but also the communications capacity is improved.

The communications quality and/or communications capacity of a cell can be greatly improved by using the introduced multi-antenna BF compared with a directional antenna. However, in the related art, the desired communications quality and communications capacity still cannot be achieved, which is a technical problem that needs to be further solved.

SUMMARY

In view of above, embodiments of the present disclosure provide a broadcast beam weight determination method and apparatus, a broadcast beam weight determination network element, a storage medium and a communications system.

The solutions of the present disclosure are implemented as described below.

In a first aspect, a broadcast beam weight determination method provided by embodiments of the present disclosure includes the steps described below.

A predicted performance indicator corresponding to a candidate broadcast beam weight combination is determined according to user information of a region.

A first broadcast beam weight combination corresponding to an optimal predicted performance indicator is determined.

The first broadcast beam weight combination is applied.

In a second aspect, a broadcast beam weight determination apparatus provided by the embodiments of the present disclosure includes a first determination module, a second determination module and an application module.

The first determination module is configured to determine a predicted performance indicator corresponding to a candidate broadcast beam weight combination according to user information of a region.

The second determination module is configured to determine a first broadcast beam weight combination corresponding to an optimal predicted performance indicator.

The application module is configured to apply the first broadcast beam weight combination.

In a third aspect, a broadcast beam weight determination network element provided by the embodiments of the present disclosure includes a transceiver, a memory and a processor.

The transceiver is configured to perform information exchange with an access network element.

The memory is configured to store information.

The processor is separately connected to the transceiver and the memory, and configured to control the information interaction between the transceiver and the access network element and the information storage of the memory by executing a computer-executable quality and to implement the broadcast beam weight determination method provided in the first aspect.

In a fourth aspect, a computer storage medium provided by the embodiments of the present disclosure is configured to store a computer-executable instruction, where after the computer-executable instruction is executed, the broadcast beam weight determination method provided in the first aspect is capable of being implemented.

In a fifth aspect, a communications system provided by the embodiments of the present disclosure includes an access network element and an adaptive adjustment network element for adjusting a broadcast beam weight.

The access network element is configured to collect user distribution information.

The adaptive adjustment network element for adjusting a broadcast beam weight is connected to the access network element for receiving the user distribution information and implementing the broadcast beam weight determination method provided in the first aspect according to the user distribution information.

Through a broadcast beam weight determination method and apparatus, a broadcast beam weight determination network element, a storage medium and a communications system provided by the embodiments of the present disclosure, a predicted performance indicator corresponding to a broadcast beam weight combination of a cell in a region is determined according to user information of the region, so that a relatively superior first broadcast beam weight combination is selected to be applied to a plurality of base stations in the region. In such way, broadcast beam weights of cells in the region can be dynamically adjusted, so that a current broadcast beam weight of the cell in the region is ensured to be matched with current user information, and the broadcast beam weights of the cells are set relative to a static mode such as network planning or network optimization. On the one hand, broadcast beam weights applicable for user information such as a current user distribution situation and the like can be dynamically adjusted according to the user information, and on the other hand, a uniform scheduling of the broadcast beam weights at the granularity of a cell can be performed by taking a region containing one or more cells as a unit of adjustment, so that problems of cell interference and the like can be well eliminated or reduced. Moreover, signal quality of the cell or signal quality in the current situation can be improved, cochannel interference or adjacent channel interference can be well controlled to improve the signal quality and ensure the communications capacity, interference is reduced as much as possible, and actual communications performance in the whole region is optimized.

DETAILED DESCRIPTION

Solutions of the present disclosure will be described in detail with reference to the drawings and specific embodiments.

Figure 1:
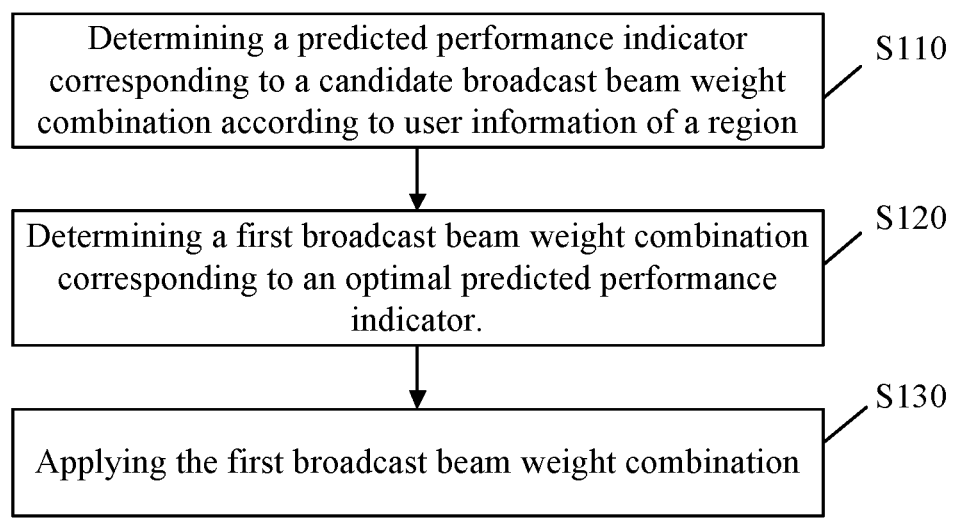
FIG. 1 is a flowchart of a first broadcast beam weight determination method according to an embodiment of the present disclosure.

As shown in FIG. 1, a broadcast beam weight determination method provided by the embodiment includes the steps described below.

In step S110, a predicted performance indicator corresponding to a broadcast beam weight combination is determined according to user information of a region.

In step S120, a first broadcast beam weight combination corresponding to an optimal predicted performance indicator is determined.

In step S130, the first broadcast beam weight combination is applied.

The broadcast beam weight determination method provided by the embodiment is a dynamic adjustment method of a broadcast beam weight. For example, the broadcast beam weight determination method may be a broadcast beam weight adaptive adjustment, the adjustment to the broadcast beam weight is spontaneous and automatic without manual triggering or manual configuration by network management personnel.

The broadcast beam weight determination method provided by the embodiment may be applied to a broadcast beam weight determination network element who has an adjustment authority on broadcast beam weights of all cells in the region, a connection is established between the broadcast beam weight determination network element and a base station of the cell, and thus the broadcast beam weight determination network element can directly or indirectly receive user distribution information from cells in the region.

The broadcast beam weight determination network element may be a mobile management entity (MME), an access management function (AMF), a control equipment of an operation control system (OCS), or an adjustment device specially set for adjusting the broadcast beam weight. The adjustment equipment may be located in an access network, a core network or a background management service system of a network. In summary, the broadcast beam weight determination network element can acquire user information, and send a control instruction to a corresponding base station or a cell after the first broadcast beam weight combination is determined at the same time, and control the corresponding cell or base station to adjust the broadcast beam weight thereof.

The region may be one predefined region, and the one region includes one or more cells.

One broadcast beam weight determination network element may perform the broadcast beam weight combination determination on a plurality of regions. For example, the one region may be one or more tracking regions, the one region may further be a region corresponding to a cell in a plurality of cell lists, and the plurality of regions may share a broadcast beam weight determination network element that determines a broadcast beam weight.

In some embodiments, the plurality of cells included in the region may be continuously distributed cells, and the region may be a continuous cell band formed by a plurality of continuously distributed cells.

In some embodiments, the region includes an integer number of cells, so that the region is avoided to include only part of one cell. When the region includes only part of one cell, adjustment of the broadcast beam weights not at the granularity of a cell is advantageous for the performance of only the part within the cell and disadvantageous for other part of the cell.

For example, cells in the region form a cell set, broadcast beam weights of all cells in the cell set may be uniformly scheduled, on the one hand, the signal quality and/or the communications capacity are improved, on the other hand, the broadcast beam weights of all cells in the cell set corresponding to the region are uniformly scheduled, cochannel interference or adjacent channel interference can be reduced while the signal quality of the cell is ensured as much as possible. For example, inter-neighboring cell interference between neighboring cells can be reduced as much as possible. A combination of broadcast beam weights of a plurality of cells may be referred to as a broadcast beam weight combination in this embodiment. For example, the broadcast beam weight combination may include the first broadcast beam weight combination and/or the second broadcast beam weight combination.

The user information at least includes user distribution information. For example, the user distribution information may include: information about user distribution situation in a region, which may include one or more of the parameters: a number of users in cells in the region, where the number of users is short for a number of user accounts, for example, one cell phone number may correspond to one user as for mobile communication; an average distribution density of the cells in the region; a distribution density of the cells in a horizontal direction in the region, where for example, users at different vertical heights in a cell are projected into a same plane, and the distribution density in the horizontal direction of cells is calculated; and a distribution density of the cells in the region in a vertical direction, where for example, the distribution density is obtained according to a number of users at different heights of the cells.

For example, for a distribution density of users in a multi-layer teaching building and a distribution density of users on a Track-and-Field Ground, the Track-and-Field Ground is flat and wide, all users are concentrated in one plane without a stand included, so that a distribution density at other vertical heights may be zero. In the teaching building, each layer has a number of users, so that the distribution density of users in each layer needs to be considered, and at the moment, a vertical distribution density may be adopted.

In some embodiments, the user distribution information may further be counted according to user types, for example, numbers of different types of users are counted according to mobile terminals or Internet of things terminals. The numbers of users may further be counted according to business types subscribed by the users, for example, some users subscribe 3G business, some users subscribe 4G business, and some users subscribe 5G business. At the moment, users subscribing different businesses have requirements for different broadcasting information, so in some embodiments, user distribution information of different business types may further be counted according to the business types.

The user information may include at least one of: a number of users, for example, a number of users in one cell, a total number of users in a cell set formed by a plurality of neighboring cells, or all user data of a whole region; information about user distribution and location, which may include a user density and/or distribution data at different locations and the like; a number of users using broadcast beams corresponding to different broadcast beam weights; an incident angle of a broadcast beam used by a user or a user set, where the incident angle includes: a horizontal incident angle and/or a vertical incident angle, and the user set includes at least two users; user receiving power of a broadcast beam used by a user or a user set; a signal-to-interference-plus-noise ratio (SINR) of a broadcast beam used by a user or a user set; or neighboring cell interference information of a broadcast beam used by a user or a user set.

User information of a broadcast beam weight determination network element may be received from an access network element, a core network element or a network management equipment; and the use information may further be reported from a terminal equipment of a receiving user. Therefore, the user information of the broadcast beam weight determination network element may be from a plurality of sources.

The broadcast beam weight combination in this embodiment includes one or more broadcast beam weights. The broadcast beam weight may include one or more of: a horizontal orientation of a broadcast beam, a horizontal width of the broadcast beam, a downward inclination angle of the broadcast beam, and a vertical width of the broadcast beam.

The broadcast beam herein is a beam transmitting various types of information transmitted in a broadcast manner, and the information includes, for example, a system message transmitted in a broadcast manner, a control command transmitted in a broadcast manner, etc.

In this embodiment, an applied performance indicator of one or more sets of broadcast beam weights in a broadcast beam weight combination set is determined according to the user information of the region. The performance indicator herein is calculated through various objective functions or algorithms and the like, and is a predicted performance indicator simulated by using a particular simulation mode, so that the performance indicator is called the predicted performance indicator in the embodiment in order to tell apart from an actually measured performance indicator.

The predicted performance indicator may include at least one of: a predicted access success rate, a predicted dropping rate, a predicted channel quality indicator (CQI), or a predicted overall signal-to-noise ratio.

The above performance indices can generally reflect the signal quality and/or communications capacity of the region.

It is assumed that a second broadcast beam weight has been applied within the region currently. In a case where the predicted performance indicator is calculated, the broadcast beam weight set has M+1 sets of broadcast beam weight combinations, and the current second broadcast beam weight is one set.

In one mode, step S110 may include: traversing the M+1 sets of broadcast beam weight combinations in the broadcast beam weight combination set, calculating the predicted performance indices of the M+1 sets of broadcast beam weight combinations, and selecting an optimal predicted performance indicator from the predicted performance indices as a first broadcast beam weight combination. At the moment, the selected first broadcast beam weight combination may be the currently applied second broadcast beam weight combination.

In another mode, step S110 may include: traversing M sets of broadcast beam weight combinations except the second broadcast beam weight combination in the broadcast beam weight combination set, calculating the predicted performance indices of the M sets of broadcast beam weight combinations, and selecting an optimal predicted performance indicator from the predicted performance indices; and in response to the optimal predicted performance indicator of the M sets of broadcast beam weight combinations being better than an actual performance indicator of the second broadcast beam weight combination, configuring the broadcast beam weight combination corresponding to the optimal predicted performance indicator as a first broadcast beam weight combination and using the first broadcast beam weight combination to replace the second broadcast beam weight combination. Thus, it can be ensured that the predicted performance indicator of the first broadcast beam weight combination currently used for replacement is not worse than the predicted performance indicator or the actual performance indicator of the second broadcast beam weight combination.

If the determined optimal predicted performance indicator is better than the actual performance indicator of the second broadcast beam weight combination, the second broadcast beam weight combination of all cells in the region is replaced by the first broadcast beam weight combination.

It is assumed that the region includes N cells, the first broadcast beam weight combination includes broadcast beam weights of N cells, where N is a positive integer, and the N cells may have a same broadcast beam weight or different broadcast beam weights. For example, it is assumed that each cell has S sets of broadcast beam weights, so that a broadcast beam weight combination set including N cells may include $S^N$ sets of broadcast beam weight combinations.

For example, a performance indicator corresponding to each set of broadcast beam weight in a broadcast beam weight combination set is predicted in a traversing manner. The performance indices of all sets of broadcast beam weights are compared to obtain an optimal predicted performance indicator, and a first broadcast beam weight combination is determined based on the optimal predicted performance indicator, where the first broadcast beam weight combination may be used to replace a second broadcast beam weight combination currently applied of each cell in the region. In this embodiment, the predicted performance indicator of the first broadcast beam weight combination is at least superior to the actual performance indicator of the second broadcast beam weight combination currently applied to an antenna system. Thus, through an adaptive mode, cells in the region may adjust the current broadcast beam weight, the signal quality and/or communications capacity of the cells in the region can be optimized through the broadcast beam weight. Comparing with a mode of statically setting the broadcast beam weight through network planning or network optimization, the broadcast beam weight combination suitable for the current user distribution information can be dynamically selected according to the current user distribution information to replace the current broadcast beam weight combination (i.e., the second broadcast beam weight combination) so as to improve the signal quality and/or communications capacity.

In some embodiments, step S110 may further include: taking user information as an input and taking a preset performance indicator as an output by utilizing a big data model.

The big data model is: a model obtained through sample data training, and may include: a neural network, a vector machine model and linear or nonlinear regression models, etc. The big data model determines a model parameter through training of a sample data model; and if the model parameter is determined, the user information and a candidate broadcast beam weight are taken as an input, and after a series of calculation or information processing in the bit data model, the preset performance indicator of the candidate broadcast beam weight is output.

In summary, the various modes for acquiring the predicted performance indicator are obtained in step S110, and the mode for acquiring the predicted performance indicator is not limited to any of the above.

Once the predicted performance indices of candidate broadcast beam weights are determined, a first broadcast beam weight combination of the optimal predicted performance indicator can be obtained through processing such as comparison of the predicted performance indices in step S120.

Step S130 may include: an access network element in a region not yet applying a broadcast beam weight setting the weight of the broadcast beam and/or sending the weight of an antenna of the broadcast beam directly according to a first broadcast beam weight combination indicated by an application instruction; and/or an access network element having applied the broadcast beam weight after receiving the application instruction switching the applied broadcast beam weight into a broadcast beam weight corresponding to the first broadcast beam weight combination according to application quality.

In some embodiments, step S110 may include: calculating the predicted performance indicator corresponding to a candidate broadcast beam weight combination by using an objective function and taking user information as an input.

In this embodiment, an objective function may be preset, and the objective function may be used for calculating predicted performance indices corresponding to broadcast beam weight combinations. For example, the broadcast beam weight combination corresponding to current user distribution information is taken as an objective function; and a function value is calculated based on the objective function, where the function value may be the predicted performance indices. The predicted performance indices may include indicators reflecting the signal quality of the region and/or capacity indicators reflecting the communications capacity of the region, etc.

In some embodiments, the method further includes the step described below.

The objective function is selected according to a predetermined performance criterion.

Since the communications system has various performance indices, different performance requirements need to be satisfied under different communications environments or different communications requirements. Therefore, in this embodiment, the objective function is selected according to the predetermined performance criterion before calculating the predicted performance indices.

In some embodiments, the step of selecting the objective function according to a predetermined performance criterion includes at least one of the steps described below.

The objective function is selected according to a maximum throughput criterion of the region.

The objective function is selected according to a criterion of a maximum number of users of the region.

The objective function is selected according to a maximum throughput criterion, a first weight of a maximum throughput, a criterion of a maximum number of users and a second weight of the criterion of the maximum number of users.

The maximum throughput criterion of the region refers to a criterion aiming at maximizing data traffic of all cells in the region.

The criterion of the maximum number of users refers to a criterion aiming at maximizing the number of users accessible to all cells in the region.

In some examples, the maximum throughput criterion and the criterion of the maximum number of users may further be combined to obtain a parameter value for selecting an objective function.

For example, the objective function corresponding to the maximum throughput criterion is a first function, and the objective function corresponding to the criterion of the maximum number of users is a second function. Thus, a third function may be constructed according to the first weight, the first function, the second weight and the second function to serve as a selected objective function.

If the first weight is equal to the second weight, the selected objective function is equivalent to a weighted average based on a maximum throughput and the criterion of the maximum number of users.

In some embodiments, if it is desired to consider both the throughput and number of users in the region while one is more important, the other is slightly important but the other cannot be completely neglected, the first weight and the second weight are not zero.

In this embodiment, through the selection of the objective function, the broadcast beam weight combinations of cells in the region can be dynamically and adaptively adjusted, and the broadcast beam weight combination can further be adaptively adjusted according to current requirements.

In some embodiments, the step of selecting the objective function according to a predetermined performance criterion includes at least one of the steps described below.

The objective function is selected according to a maximum throughput criterion of the region.

The objective function is selected according to a criterion of a maximum number of users of the region.

The objective function is selected according to a maximum throughput criterion, a first weight of a maximum throughput, a criterion of a maximum number of users and a second weight of the criterion of the maximum number of users.

In other embodiments, the step of calculating the predicted performance indicator corresponding to the candidate broadcast beam weight combination by using an objective function and taking the user information as an input includes at least one of steps described below.

The predicted performance indicator is calculated according to the number of users using the broadcast beams corresponding to the different broadcast beam weights in the region and the signal-to-interference-plus-noise ratios (SINR) of the broadcast beams corresponding to the different broadcast beam weights.

The predicted performance indicator is calculated according to the number of users using the broadcast beams corresponding to the different broadcast beam weights, the SINR of the broadcast beams corresponding to the different broadcast beam weights and neighboring cell interference values of the broadcast beams corresponding to the different broadcast beam weights.

A broadcast beam corresponding to a broadcast beam weight covering the user and received signal power or the SINR is determined according to at least one of the information about user distribution and location, the number of users using the broadcast beams corresponding to the different broadcast beam weights or the incident angle of the broadcast beam used by the user or the user set.

Figure 3:
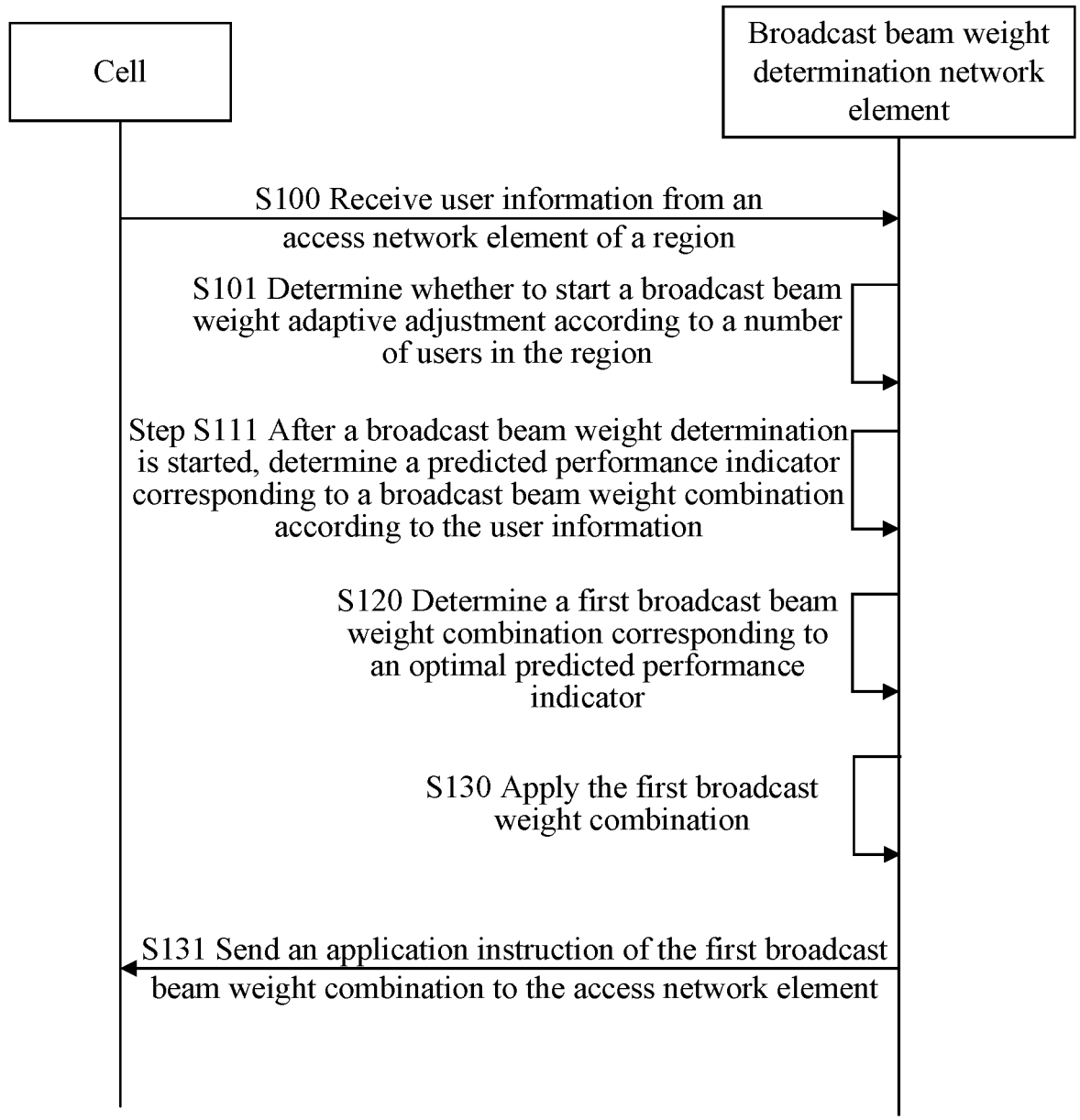
FIG. 3 is a flowchart of a third broadcast beam weight determination method according to an embodiment of the present disclosure.

In some embodiments, as shown in FIG. 3, the method further includes the step described below.

In step S101, in some embodiments, as shown in FIG. 3, the method further includes the step described below.

In step S101, whether to start broadcast beam weight adaptive adjustment is determined according to the number of users in the region.

Step S110 may include step S111, the step S111 may include: after the broadcast beam weight determination is started, a predicted performance indicator corresponding to the broadcast beam weight combination is determined according to the user information.

In this embodiment, whether to start the broadcast beam weight adaptive adjustment is determined according to the number of users in the region. In some embodiments, the broadcast beam weight determination may be performed continuously. However, in some particular situations, since the number of users in a region changes frequently or the user distribution situation is unstable, after the broadcast beam weight is switched, a next switching of the broadcast beam weight may be necessary to be performed. In order to ensure communications stability and avoid unnecessary frequent adjustment, in this embodiment, the broadcast beam weight adaptive adjustment may not be performed continuously, and in a case where the number of users in the region satisfies a particular condition, starting the broadcast beam weight adaptive adjustment is determined.

For example, in a case where the number of users in the region reaches a specified number or the number of users changes by a specified amount, starting the broadcast beam weight determination is determined.

In some embodiments, step S100 may include at least one of the modes described below.

In mode one, in condition that the number of users is greater than a first number threshold, and the number change amount between user data in a current time window and user data in a previous time window is maintained within a second preset range, the broadcast beam weight adaptive adjustment is determined to be started.

In mode two, in condition that the number of users is greater than a first number threshold and a ratio of a number change amount to the number of users is in a third preset range, the broadcast beam weight adaptive adjustment is determined to be started.

For the mode one, the time window may be a time period with a preset length of time. If the number change amount obtained by comparing the number of users in two adjacent time windows is relatively small, it can be seen that the current number of users is stable, determining the broadcast beam weight at the moment can avoid the time period of frequent switching and unnecessary switching of broadcast beam weight under the situation that the change is continuously violent, so that on the one hand, the broadcast beam weight adaptive adjustment can be achieved, on the other hand, unnecessary broadcast beam weight switching can be avoided, and unnecessary calculation load and calculation and adjustment overhead are reduced. The second preset range may be a predetermined value.

For the mode two, the mode two differs from the mode one in that the ratio of the number change amount to the number of users is highlighted, while in the mode one the absolute value of the number change amount is highlighted, if the ratio is in the third preset range, for example, the ratio is relatively small, it is indicated that the number of users in the current time period fluctuates less, and the broadcast beam weight adaptive adjustment may be started.

If the broadcast beam weight adaptive adjustment is started, step S110 is entered. The second broadcast beam weight combination may be a broadcast beam weight combination currently used by a cell in the region.

In some embodiments, the method further includes the step described below.

The second broadcast beam weight combination is determined after the broadcast beam weight adaptive adjustment is started.

In this embodiment, after the broadcast beam weight adaptive adjustment is started, the second broadcast beam weight combination is determined, and the second broadcast beam weight combination may directly be the current broadcast beam weight combination of cells in the region. In other embodiments, the second broadcast beam weight combination may be dynamically determined after the broadcast beam weight adaptive adjustment is started.

In some embodiments, the step of determining the second broadcast beam weight combination after the broadcast beam weight adaptive adjustment is started includes the steps described below.

When the broadcast beam weight adaptive adjustment is to be started, the scenario type corresponding to the region is determined firstly, and for example, the step may specifically include: after the broadcast beam weight adaptive adjustment is started, determining the scenario type according to at least one of the user distribution information, a coverage region planning or historical statistics data.

The second broadcast beam weight combination is determined according to the scenario type.

In this embodiment, the scenario type corresponding to the region is determined firstly, a second broadcast beam weight combination applicable for the scenario type may be preliminarily determined according to the scenario type, and with a very high probability, the current second broadcast beam weight combination determined according to the scenario type is the optimal broadcast beam weight in the current region, so that the calculation for subsequently obtaining predicted performance indices of other broadcast beam weight combinations can be simplified, switching times of the broadcast beam weight in the region can be reduced, and instability of the system caused during switching gaps is reduced.

The step of determining the scenario type corresponding to the region at least includes the modes described below.

In mode one, the scenario type is determined according to user distribution information.

In mode two, the scenario type is determined according to a coverage region planning.

In mode three, the scenario type is determined according to historical statistics data.

In mode four, the scenario type is determined by combining one or more of the mode one, the mode two and the mode three. For example, to accurately determine the scenario type, in condition that any two of mode one to mode three indicate that the current region corresponds to a same scenario type, the same scenario type may be determined to be the scenario type of the current region. In condition that scenario types determined respectively according to the mode one to the mode three are different, the scenario type may be determined as one of the scenario types according to priorities. For example, the mode priority of the mode one is higher than the priority of the mode two, and in condition that the priority of the mode two is higher than the priority of the mode three, the scenario type determined by the mode with the higher priority is selected as the finally determined scenario type in condition that the scenario types determined by the three modes are different.

The priorities of different modes may be preset or may be determined dynamically, the above case where the priority of the mode one is higher than the priority of the mode two and the priority of the mode two is higher than the priority of the mode three is an example, and the specific implementation is not limited to the above example.

When the mode for determining the scenario type is to be selected, the broadcast beam weight determination network element may select the mode according to the current self-condition. For example, in condition that the current load rate of the broadcast beam weight determination network element is very high, the mode two or the mode three may be preferentially selected to determine the scenario type, and in condition that the current load rate of the broadcast beam weight determination network element is low, the mode one may be preferentially selected.

The user distribution information includes according to at least one of: a measurement report, reference signal receiving power (RSRP) of a serving cell, RSRP of a neighboring cell, a direction of signal arrival (DOA) of the serving cell and an incident angle of the neighboring cell.

For example, according to the user distribution information currently received from a base station or a UE, a set of second broadcast beam weight combinations possibly applicable for the current region is preliminarily determined. For example, the second broadcast beam weight combination is preliminarily determined through a processing mode having less computational cost and simple calculation.

In other embodiments, step S110 may include the step described below.

A predicted performance indicator corresponding to the broadcast beam weight combination is calculated by using an objective function and taking the user information as an input.

Step S110 may include step S111, and step S111 may include: after the broadcast beam weight determination is started, a predicted performance indicator corresponding to the broadcast beam weight combination is determined according to user information in the region.

In this embodiment, whether to start the broadcast beam weight adaptive adjustment is determined according to the number of users in the region. In some embodiments, the broadcast beam weight determination may be performed continuously. However, in some particular situations, since the number of users in a region changes frequently or the user distribution situation is unstable, after the broadcast beam weight is switched, a next switching of the broadcast beam weight may be necessary to be performed. In order to ensure communications stability and avoid unnecessary frequent adjustment, in this embodiment, the broadcast beam weight adaptive adjustment may not be performed continuously, and in condition that the number of users in the region satisfies a particular condition, starting the broadcast beam weight adaptive adjustment is determined.

For example, in condition that the number of users in the region reaches a specified number or the number of users changes by a specified amount, starting the broadcast beam weight adaptive adjustment is determined.

In some embodiments, step S100 may include at least one of the modes described below.

In mode one, in condition that the number of users is greater than a first number threshold, and a number change amount between user data in a current time window and user data in a previous time window is maintained within a second preset range, the broadcast beam weight determination is started.

In mode two, in condition that the number of users is greater than a first number threshold and a ratio of a number change amount to the number of users is in a third preset range, the broadcast beam weight determination is started.

For the mode one, the time window may be a time period with a preset length of time. If the number change amount obtained by comparing the number of users in two adjacent time windows is relatively small, it can be seen that the current number of users is stable, determining the broadcast beam weight at the moment can avoid the time period of frequent switching and unnecessary switching of broadcast beam weight under the situation that the change is continuously violent, so that on the one hand, the broadcast beam weight determination can be achieved, on the other hand, unnecessary broadcast beam weight switching can be avoided, and unnecessary calculation load and calculation and adjustment overhead are reduced. The second preset range may be a predetermined value.

For the mode two, the mode two differs from the mode one in that the ratio of the number change amount to the number of users is highlighted, while in the mode one the absolute value of the number change amount is highlighted, if the ratio is in the third preset range, for example, the ratio is relatively small, it is indicated that the number of users in the current time period fluctuates less, and the broadcast beam weight adaptive adjustment may be started.

In some embodiments, the method further includes the step described below.

Before the first broadcast beam weight combination is applied, a second broadcast beam weight combination is applied according to a scenario type corresponding to the region.

In this embodiment, after the broadcast beam weight determination is started, the second broadcast beam weight combination is determined firstly, and the second broadcast beam weight combination may directly be the current broadcast beam weight combination of cells in the region; and in other embodiments, the second broadcast beam weight combination may be dynamically determined after the broadcast beam weight adaptive adjustment is started.

In some embodiment, the step of determining the second broadcast beam weight combination includes the steps described below.

After the broadcast beam weight determination is started and before the first broadcast beam weight combination is determined, the scenario type corresponding to the region is determined firstly, and for example, the step may specifically include: after the broadcast beam weight adaptive adjustment is started, determining the scenario type according to at least one of the user distribution information, a coverage region planning or historical statistics data.

The second broadcast beam weight combination is determined according to the scenario type.

In this embodiment, the scenario type corresponding to the region is determined firstly, a second broadcast beam weight combination applicable for the scenario type may be preliminarily determined according to the scenario type, and with a very high probability, the current second broadcast beam weight combination according to the scenario type is the optimal broadcast beam weight in the current region, so that the calculation for subsequently obtaining predicted performance indices of other broadcast beam weight combinations can be simplified, switching times of the broadcast beam weight in the region can be reduced, and instability of the system caused during switching gaps is reduced.

The step of determining the scenario type corresponding to the region at least includes the modes described below.

In mode one, the scenario type is determined according to user distribution information.

In mode two, the scenario type is determined according to a coverage region planning.

In mode three, the scenario type is determined according to historical statistics data.

In mode four, the scenario type is determined by combining one or more of the mode one, the mode two and the mode three. For example, to accurately determine the scenario type, in condition that any two of mode one to mode three indicate that the current region corresponds to a same scenario type, the same scenario type may be determined to be the scenario type of the current region. In condition that scenario types determined respectively according to the mode one to the mode three are different, the scenario type may be determined as one of the scenario types according to priorities. For example, the mode priority of the mode one is higher than the priority of the mode two, and in condition that the priority of the mode two is higher than the priority of the mode three, the scenario type determined by the mode with the higher priority is selected as the finally determined scenario type in condition that the scenario types determined by the three modes are different.

The priorities of different modes may be preset or may be determined dynamically; and the above case where the priority of the mode one is higher than the priority of the mode two and the priority of the mode two is higher than the priority of the mode three is an example, and the specific implementation is not limited to the above example.

When the mode for determining the scenario type is to be selected, the broadcast beam weight determination network element may select the mode according to the current self-condition. For example, in condition that the current load rate of the broadcast beam weight determination network element is very high, the mode two or the mode three may be preferentially selected to determine the scenario type, and in condition that the current load rate of the broadcast beam weight determination network element is low, the mode one may be preferentially selected.

Information for determining a second broadcast beam weight may include the above user information, and the user information may include according to at least one of: a measurement report, reference signal receiving power (RSRP) of a serving cell, RSRP of a neighboring cell, a direction of arrival (DOA) of the serving cell and an incident angle of the neighboring cell.

For example, according to the user distribution information currently received from a base station or a UE, a set of second broadcast beam weight combinations possibly applicable for the current region is preliminarily determined, and for example, the second broadcast beam weight combination is preliminarily determined through a processing mode having less computational cost and simple calculation.

Figure 2:
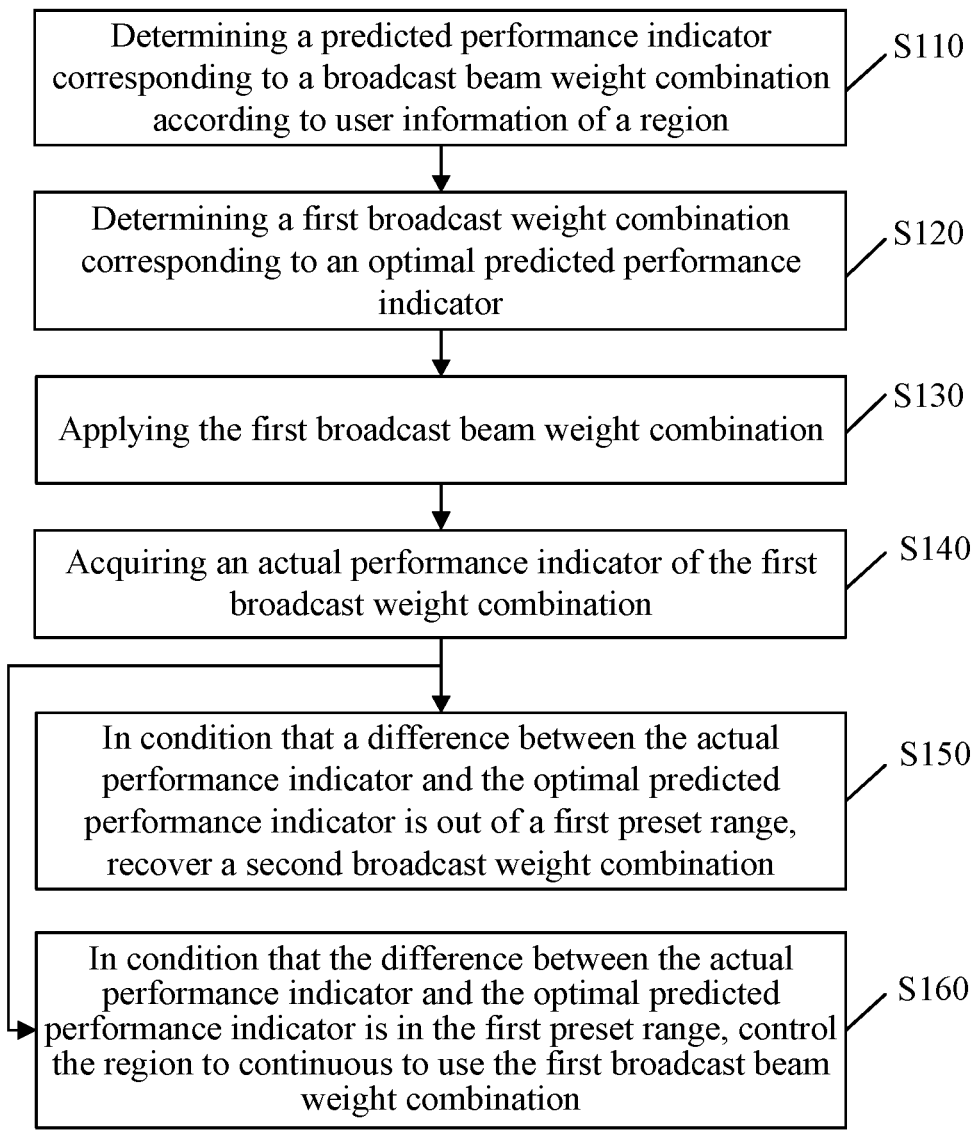
FIG. 2 is a flowchart of a second broadcast beam weight determination method according to an embodiment of the present disclosure.

In some embodiments, as shown in FIG. 2, the method further includes the steps described below.

In step S140, an actual performance indicator of a first broadcast beam weight combination is acquired.

In step S150, in condition that a difference between the actual performance indicator and an optimal predicted performance indicator is out of a first preset range, a second broadcast beam weight combination is recovered.

In condition that a current second broadcast beam weight is replaced by a first broadcast beam weight, after the broadcast beam weight is replaced by a base station, the actual performance indicator of the first broadcast beam weight may be obtained through information interaction with a user equipment through measurement, and the base station directly or indirectly reports the measured actual performance indicator to a broadcast beam weight determination network element for performing the broadcast beam weight adaptive adjustment, so as to enable the broadcast beam weight determination network element to obtain the actual performance indicator after the current first broadcast beam weight is applied to an antenna of the cell in the region.

In condition that after the broadcast beam weight determination network element switches from the second broadcast beam weight to the first broadcast beam weight, the actual performance indicator is found to be much worse than the predicted performance indicator, the actual performance indicator may be lower after the second broadcast beam weight is replaced, so that the original second broadcast beam weight is recovered by the broadcast beam weight determination network element according to the actual performance indicator in order to ensure the signal quality and/or the communications capacity of the communications system.

The first preset range may be determined by a difference between the predicted performance indicator of the first broadcast beam weight combination and the actual performance indicator of the second broadcast beam weight combination.

For example, for the predicted performance indicator of the first broadcast beam weight combination and the actual performance indicator A of the second broadcast beam weight combination, A is a positive number, and the first preset range may be [−A, ∞). Thus, in condition that the difference between the actual performance indicator of the first broadcast beam weight combination and the optimal predicted performance indicator is outside the first preset range, that is, the difference between the actual performance indicator of the first broadcast beam weight combination and the predicted performance indicator is in (−∞, −A) and signal quality and/or communications capacity can be obtained by continuing to use the second broadcast beam weight.

In some embodiments, the first preset range may be [−B, ∞), B may be smaller than A.

In other embodiments, the method further includes: counting the number of times of the difference outside the first preset range, in condition that the number of times reaches a particular number, an objective function or algorithm or simulation mode for calculating the predicted performance indicator is adjusted, so that the performance indicator predicted by the objective function or the algorithm or the simulation mode can be closer to the actual performance indicator.

In some embodiments, as shown in FIG. 2, the method further includes the step described below.

In step S160, in condition that the difference between the actual performance indicator and the optimal predicted performance indicator is in the first preset range, the region is controlled to continuously use the first broadcast beam weight combination.

In this embodiment, it is equivalent to apply the second broadcast beam weight combination in step S130, in condition that the actual performance test in step S140 is passed, the actual performance indicator of the second broadcast beam weight combination can be obtained, and in condition that the actual performance indicator is not greatly different from the predicted performance indicator, the second broadcast beam weight combination can be officially put into use, thereby achieving the adaptive adjustments to the broadcast beam weight determination of all cells in the region.

As shown in FIG. 3, the method further includes the steps described below.

In step S100, the user information is received from an access network element of the region.

In step S131: an application instruction of the first broadcast beam weight combination is sent to the access network element.

In this embodiment, the access network element may be a base station, a small base station, a micro base station, a home base station or a wireless access hotspot and other network elements which can be accessed by user equipments, such as an evolved node B (eNB), a next generation base station (gNB), a radio remote unit (RRU), and the like.

The access network element may further include: a relay node, the relay node may include: a mobile relay node, a fixed relay node and a nomadic relay node. The mobile relay node may be a dynamically moving relay node, the fixed relay node may be a relay node fixed in a place for a long time, and the nomadic relay node may be a relay node fixed in a place in a special situation.

In condition that the special situation ends, the nomadic relay node moves away.

The broadcast beam weight determination network element provided by this example receives the user information directly or indirectly from the access network element before step S110 is executed.

By executing the above steps S110 and S130, when the broadcast beam weight combination in a region is determined to need to be switched, the broadcast beam weight determination network element notifies a base station to use the broadcast beam weight corresponding to the first broadcast beam weight combination in the corresponding cell by issuing an application instruction. For example, the application instruction carries an index of the broadcast beam weight corresponding to the first broadcast beam weight combination, or a content of the broadcast beam weight itself.

Figure 4:
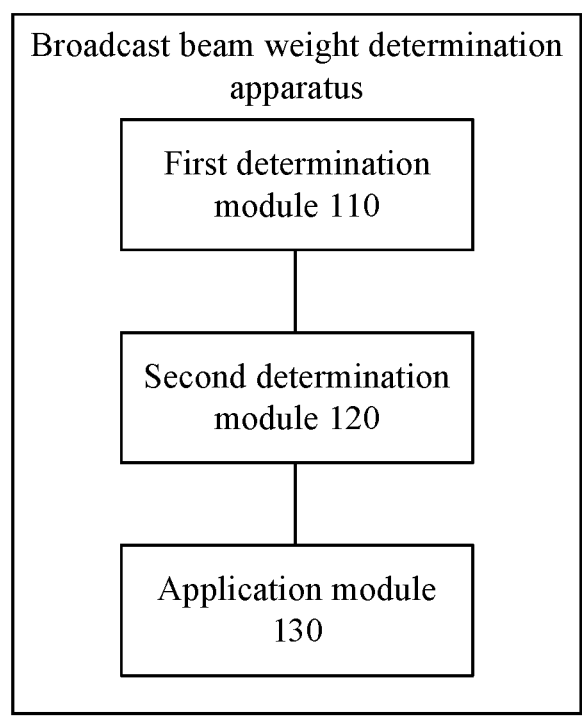
FIG. 4 is a structural diagram of a broadcast beam weight determination apparatus according to an embodiment of the present disclosure.

As shown in FIG. 4, a broadcast beam weight determination apparatus provided by the embodiment includes a first determination module 110, a second determination module 120 and an application module 130.

The first determination module 110 is configured to determine a predicted performance indicator corresponding to a candidate broadcast beam weight combination according to user information of a region.

The second determination module 120 is configured to determine a first broadcast beam weight combination corresponding to an optimal predicted performance indicator.

The application module 130 is configured to apply the first broadcast beam weight combination.

The broadcast beam weight determination apparatus provided by the embodiment may be applied to the above broadcast beam weight determination network element, the broadcast beam weight determination network element may be an existing network element integrated with an adaptive adjustment function of a broadcast beam weight combination of a cell in a region, and may further be a newly added network element newly added to a network, for example, a network element newly added to an access network or a network element newly added to a control plane of a core network.

In some embodiments, the first determination module 110, the second determination module 120 and the application module 130 may all be program modules that, when executed by a processor, enable the prediction of the predicted performance indicator, select a first broadcast beam weight combination, and indicate the switching of broadcast beam weights of cells in a region.

In other embodiments, the first determination module 110, the second determination module 120 and the application module 130 may all be hardware modules or a combination of hardware and software modules. For example, the first determination module 110, the second determination module 120 and the application module 130 may correspond to a Field Programmable Gate Array (FPGA) or a complex programmable device, etc.

In some embodiments, the user information includes at least one of: a number of users; information about user distribution and location; a number of users using broadcast beams corresponding to different broadcast beam weights; an incident angle of a broadcast beam used by a user or a user set, where the incident angle includes: a horizontal incident angle and/or a vertical incident angle, and the user set includes at least two users; user receiving power of a broadcast beam used by a user or a user set; a signal-to-interference-plus-noise ratio (SINK) of a broadcast beam used by a user or a user set; or neighboring cell interference information of a broadcast beam used by a user or a user set In some embodiments, the first determination module 110 is configured to calculate the predicted performance indicator corresponding to the candidate broadcast beam weight combination by using an objective function and taking the user information as an input.

In some embodiments, the apparatus further includes a selection module, which is configured to select the objective function according to a predetermined performance criterion.

The selection module may be configured to execute at least one of the steps described below.

The objective function is selected according to a maximum throughput criterion of the region.

The objective function is selected according to a criterion of a maximum number of users of the region.

The objective function is selected according to a maximum throughput criterion, a first weight of a maximum throughput, a criterion of a maximum number of users and a second weight of the criterion of the maximum number of users.

In some embodiments, the first determination module is configured to execute at least one of the steps described below.

The predicted performance indicator is calculated according to the number of users using the broadcast beams corresponding to the different broadcast beam weights in the region and signal-to-interference-plus-noise ratios (SINR) of the broadcast beams corresponding to the different broadcast beam weights.

The predicted performance indicator is calculated according to the number of users using the broadcast beams corresponding to the different broadcast beam weights, SINR of the broadcast beams corresponding to the different broadcast beam weights and neighboring cell interference values of the broadcast beams corresponding to the different broadcast beam weights.

A broadcast beam corresponding to a broadcast beam weight covering the user and received signal power or a SINR is determined according to at least one of the information about user distribution and location, the number of users using the broadcast beams corresponding to the different broadcast beam weights or the incident angle of the broadcast beam used by the user or the user set.

In some embodiments, the apparatus further includes a third determination module.

The third determining module is configured to determine whether to start the broadcast beam weight determination according to a number of users in the region before determining a predicted performance indicator corresponding to a broadcast beam weight combination.

The first determination module is configured to execute at least one of steps described below.

In condition that the number of users is greater than a first number threshold, and a number change amount between user data in a current time window and user data in a previous time window is maintained within a second preset range, the broadcast beam weight determination is started.

In condition that the number of users is greater than a first number threshold and a ratio of a number change amount to the number of users is in a third preset range, the broadcast beam weight determination is started.

In some embodiments, a fourth determination module is included and is configured to apply a second broadcast beam weight combination according to a scenario type corresponding to the region before applying the first broadcast beam weight combination.

In some embodiments, the apparatus further includes a first acquisition module and a recovery module.

The first acquisition module is configured to acquire an actual performance indicator of the first broadcast beam weight combination.

The recovery module is configured to recover a second broadcast beam weight combination in condition that a difference between the actual performance indicator of the first broadcast beam weight combination and an optimal predicted performance indicator is out of a first preset range.

In some other embodiments, the application module 130 is configured to control the region to continuously use the first broadcast beam weight combination in condition that the difference between the actual performance indicator and the optimal predicted performance indicator is in the first preset range.

In some embodiments, the apparatus further include: a receiving module, which is configured to receive the user information from an access network element of the region; and a sending module, which is configured to send an application instruction of the first broadcast beam weight combination to the access network element.

Specific examples are provided below in conjunction with any embodiment described above.

Example One

The example provides a method capable of quickly and adaptively adjusting broadcast beam weights of multiple cells in a region according to user distribution situation. According to the method, based on a measurement of the user distribution situation, cell capacity and performance prediction under different broadcast beam weight combinations of cells are evaluated, and an optimal broadcast beam weight combination is selected to improve system performance.

Figure 5:
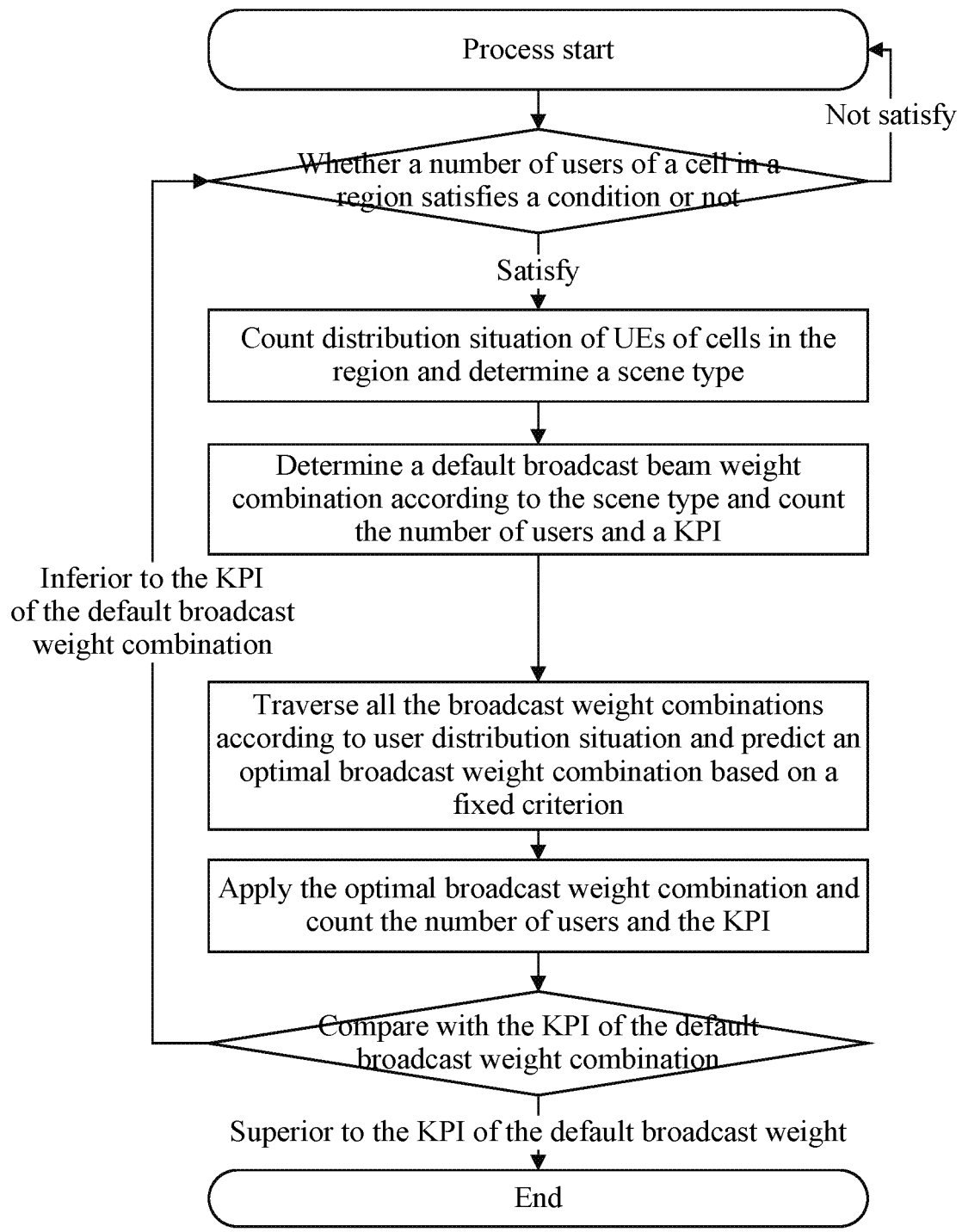
FIG. 5 is a flowchart of a fourth broadcast beam weight determination method according to an embodiment of the present disclosure.

As shown in FIG. 5, the solution provided by the example may be described below.

In a first step, whether the number of users of a cell in a region satisfies a condition is determined, and for example, whether to start an adaptive adjustment is determined according to changes in the number of users of all cells in the region. For example, the changes in the number of users of all cells in the region is determined on the basis that the total number of users of all cells is greater than a first fixed threshold and the statical changes between the numbers of users of all cells in two adjacent time windows. As another example, the statical changes between the numbers of users in two adjacent time windows are obtained by comparing a second fixed threshold with a ratio of the difference between the numbers of users in a later window and a previous window to the total number of users.

In a second step, distribution situation of UEs of cells in the region is counted, and a scenario type is determined. For example, a broadcast beam weight combination with the maximum coverage is selected to count the user distribution situation, and the scenario type is determined according to the user distribution situation. For example, the user distribution situation includes, but is not limited to, direction of arrival of a serving cell in which the user is located and of a neighboring cell and RSRP information of the serving cell and the neighboring cell included in a measurement report specified in the 3GPP protocol. As another example, a scenario type determined based on the user distribution may be defined according to a coverage region, such as a gym including scenarios like a sporting event, a concert, etc. The broadcast beam weight combination with the maximum coverage may be a broadcast beam weight combination with the largest coverage range of the broadcast beams, so that the user distribution situation information can be collected as comprehensively as possible. Through the transmission of the broadcast beam of the broadcast beam weight combination with the maximum coverage, the user distribution situation information can be comprehensively and accurately collected based on the information interaction with a base station such as the reception of the broadcast beam by the user, the information request access transmitted by the broadcast beam and the like.

In a third step, a default broadcast beam weight combination is determined according to the scenario type, and the number of users and a key performance indicator (KPI) are counted. Specifically, the default broadcast beam weight combinations of all cells in a region are selected according to the determined user distribution scenario type, and the numbers of users of all cells and KPIs reflecting system performance at the moment are counted. In some examples, the default broadcast beam weight combination may be a weight selected based on a network optimization result configured in a background, and the default broadcast beam weight combination may also continue to use a historical optimal broadcast beam weight after the weight is calculated by using the method provided in the present disclosure. In some examples, the KPI includes, but is not limited to, a KPI of a wireless communications system such as a connection success rate of a radio resource connection (RRC), a switching success rate, etc. The KPI herein may be all performance indicators described above, such as the access success rate of a user, the drop rate, the CQI, etc.

In a fourth step, all the broadcast beam weight combinations are traversed according to the user distribution situation, the optimal broadcast beam weight combination is predicted based on a fixed criterion, for example, all the change situations of the user receiving power and the size of the interference from neighboring cells are calculated under the broadcast beam weight combination according to the fixed criterion such as the criterion of the maximum number of users and/or the maximum throughput criterion, and the optimal weight combination is selected based on the overall system performance of the region. In some examples, based on the distribution information of each user in the local region, cell attribution, and magnitude of received energy and interference energy of adjacent cells of the user under different weights may be calculated according to the DOA, and the receiving situation of signal-to-noise ratio of each user is obtained based on the calculation. In some examples, the optimal weight selection algorithm includes, but is not limited to, a joint objective function criterion obtained based on a maximum throughput criterion of all cells in an adjustment region or a criterion of a maximum number of users or a weighted average of the two criteria.

In a fifth step, the optimal broadcast beam weight combination is applied, the number of users and the KPI are counted. At the moment, the KPI may be an actual performance indicator obtained through actual measurement. The fifth step may specifically include: after the last broadcast beam weight combination is applied, the KPI at the moment is recorded.

A sixth step is an optional step. In the sixth step, the recorded KPI is compared with the KPI of the default broadcast beam weight. In condition that the recorded KPI is superior to the KPI of the default broadcast beam weight, the current broadcast beam weight determination is ended, and in condition that the recorded KPI is inferior to the KPI of the default broadcast beam weight, the first step is returned. The sixth step may specifically include: the KPI measured by the optimal broadcast beam weight combination is applied, the KPI measured by the optimal broadcast beam weight combination is compared with the KPI recorded of the previous default broadcast beam weight combination, and the optimal weight is valid in condition that the KPI representing the system performance is improved beyond a threshold. In some examples, the latest weight combination described above may be used to update and replace the historical optimal weight under the scenario, and subsequent default broadcast beam weight combination may directly use the latest broadcast beam weight combination.

By adopting the method provided by the example, a single cell or a plurality of cells may quickly and adaptively adjust broadcast beam weights of multiple cells in the region according to the user distribution situation so as to achieve the optimal overall system of all the cells.

Example Two

Figure 6A:
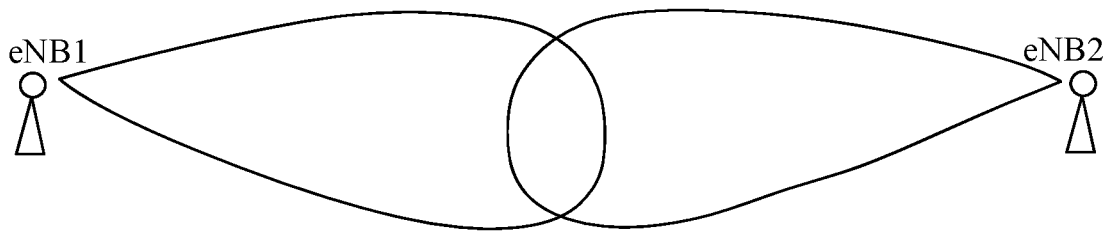
FIG. 6A to FIG. 6D are schematic views illustrating coverage of broadcast beams of different broadcast beam weights according to an embodiment of the present disclosure.
Figure 6B:
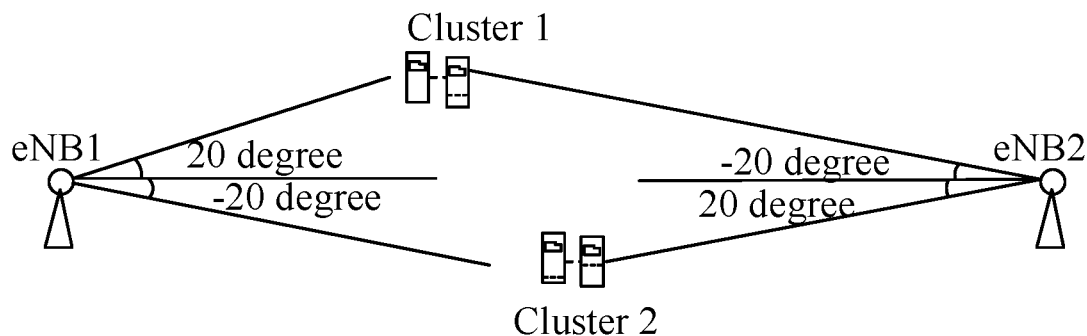

A region is covered by two cells respectively of two base stations, and the broadcast beam coverage of the initial broadcast beam weight of the region is shown in FIG. 6A. It is assumed that users in the region are distributed into two clusters, each cluster has 100 commercial users, specifically corresponding to cluster 1 and cluster 2 shown in FIGS. 6B and 6D, and a user cluster generally includes a plurality of user equipments. Cluster 1 and cluster 2 shown in FIGS. 6B and 6D are both illustrated by taking two user equipments as examples and are not limited to two user equipments in a specific implementation. After the distribution of the number of users is determined, an adaptive broadcast beam weight adjustment method is started, and a broadcast beam weight set may be shown in the table described below.

| Beam parameter index | Horizontal orientation | Horizontal width of the broadcast beam | Downward inclination angle | Vertical width of the broadcast beam |
|---|---|---|---|---|
| 1 | 0 | 65 | 0 | 40 |
| 2 | 0 | 65 | 0 | 10 |
| 3 | 0 | 65 | 3 | 40 |
| 4 | 0 | 65 | 3 | 10 |
| 5 | 20 | 20 | 0 | 10 |
| 6 | 20 | 20 | 3 | 10 |
| 7 | −20 | 20 | 0 | 10 |
| 8 | −20 | 20 | 3 | 10 |

The solution provided by the example may include the steps described below.

In step 1, the time window is counted as 10 seconds, the threshold of the number of users is 100, the threshold of changes in the number of users is 3%, it can be seen that in the example, the number of users in the region is 200 which is larger than the threshold of the number of users, and the proportion of the changes in the numbers of users between the previous time window and the later time window is 0%, so that the condition of starting the adaptive adjustment is met, and the subsequent steps are triggered.

In step 2, at the moment, (0, 65, 0, 40) corresponding to the weight combination index 1 with the maximum coverage is selected, the incident angle sets of cluster 1 and cluster 2 of all commercial user sets at eNB1 and eNB2 are estimated as {20, 0}/{−20, 0} and {20, 0}/{−20, 0} where two numbers within 0 respectively represents a horizontal incident angle and a vertical incident angle, respectively corresponded RSRP and the like are counted as shown in FIG. 6B, and the scenario type is determined to be a commercial users-evenly-horizontally-distributed scenario according to the user distribution situation.

Figure 6C:
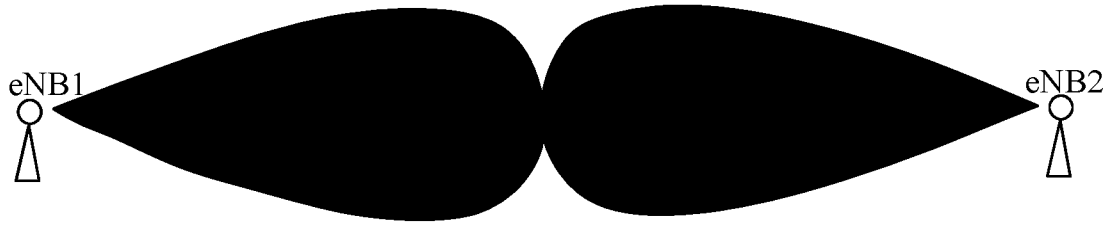
Figure 6D:
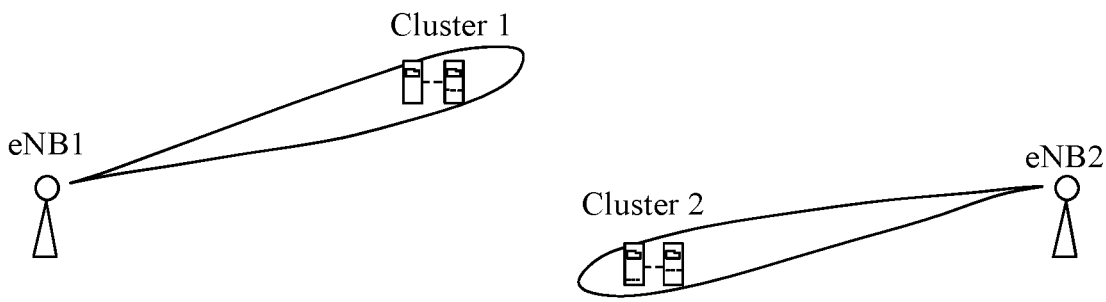

In step 3, according to the determined commercial users-evenly-horizontally-distributed scenario, a default broadcast beam weight combination index 2 is selected respectively for both the cell eNB1 and the cell eNB2 in the region as shown in FIG. 6C, numbers of users of cells and KPIs reflecting system performance at the moment are counted. The KPIs reflecting system performance may include: the number of RRC connected users being 200, the access success rate being 100%, and the average CQI reporting value being 9.

In step 4, according to the user distribution situation, all weight combinations are traversed and all the change situations of the user receiving power and the size of the interference from neighboring cells under the combination are calculated, the SINR of all users under full system load is counted, and the objective function reflecting the optimal system may be designed as $F(x, y)=0.5*$the number of RRC connected users $(x, y)+0.5*\Sigma_{i=1}^{N}SINR_{x,y}(i)$, where N represents the number of all connected users in the region, and x and y respectively represent indices of broadcast beam weights of two cells, corresponding to the above set list. On the basis of the principle of the maximum objective function, the indices for selecting the optimal broadcast beam weights for eNB1 and eNB2 are (index 5, index 5).

In step 5, the indices applied of the above optimal broadcast beam weight combination are (index 5, index 5), and may be shown in FIG. 6D, the KPI at the moment is recorded including the number of RRC connected users of 200, the access success rate of 100% and the average CQI reporting value of 10.5. The KPI is compared with the KPI recorded of the previous default broadcast beam weight combination, it can be seen that the CQI indicator indicating the downlink signal quality of the terminal receiving base station is obviously improved, therefore, the optimal weight is valid, the scenario maintains the application of the weight, and replaces the weight with the default broadcast beam weight combination of the subsequent commercial users-evenly-horizontally-distributed scenario.

At the moment, a new broadcast beam weight combination is obtained through adaptive calculation according to the base station and the user distribution situation, and compared with the default broadcast beam weight combination, the combination effectively improves the system performance.

As shown in FIGS. 6A to 6D, through the broadcast beam weight adaptive adjustment, it is possible to switch from the broadcast beam shown in FIG. 6C to the broadcast beam shown in FIG. 6D. Obviously, mutual interference between base stations can be reduced on the one hand, and communications quality of each base station itself can be ensured on the other hand.

Example Three

Figure 7A:
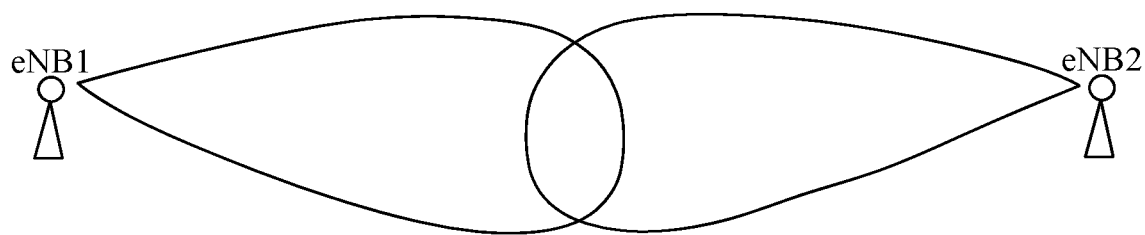
FIG. 7A is a schematic view illustrating coverage of a broadcast beam corresponding to a broadcast beam weight according to an embodiment of the present disclosure.
Figure 7B:
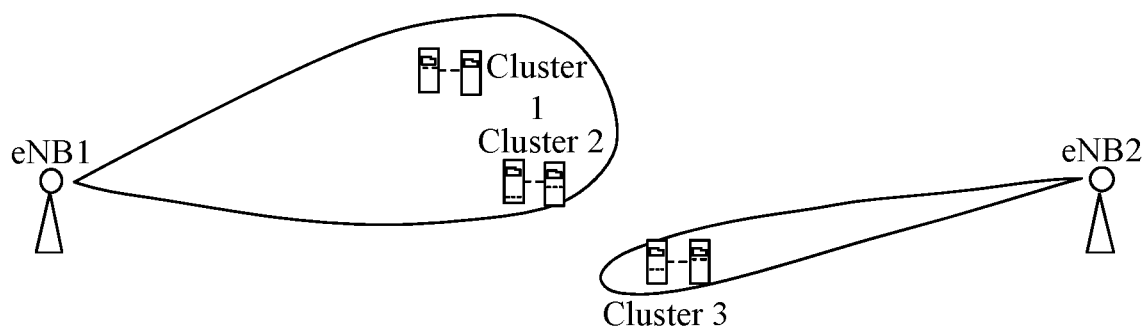
FIG. 7B is a schematic view illustrating coverage of a broadcast beam corresponding to another broadcast beam weight according to an embodiment of the present disclosure.

A region is covered by two cells respectively of two base stations, and the broadcast beam coverage of the initial broadcast beam weight of the region is shown in FIG. 7A. It is assumed that users in the region are distributed into three clusters, and each cluster has 100 commercial users, specifically corresponding to cluster 1 to cluster 3 in FIG. 7B. Compared with the example one, users of the example three are mainly different in vertical dimension distribution.

After the distribution of the number of users is determined, an adaptive broadcast beam weight adjustment method is started, and an optional broadcast beam weight set may be shown in the table described below.

| Index | Horizontal orientation | Horizontal width of the broadcast beam | Downward inclination angle | Vertical width of the broadcast beam |
| --- | --- | --- | --- | --- |
| 1 | 0 | 65 | 0 | 40 |
| 2 | 0 | 65 | 0 | 10 |
| 3 | 0 | 20 | −9 | 10 |
| 4 | 0 | 20 | 3 | 10 |
| 5 | 20 | 40 | 0 | 10 |
| 6 | 20 | 20 | 3 | 10 |
| 7 | −20 | 20 | 0 | 10 |
| 8 | −20 | 40 | 3 | 10 |

The solution provided by the example may include the steps described below.

In step 1, the time window is counted as 30 seconds, the threshold of the number of users is 200, the threshold of changes in the number of users is 5%, it can be seen that in the example, the number of users in the region is 300 which is larger than the threshold of the number of users, and the proportion of the changes in the numbers of users between the previous time window and the later time window is 0%, so that the condition of starting the adaptive adjustment is met, and the subsequent steps are triggered.

In step 2, at the moment, (0, 65, 0, 40) corresponding to the weight combination index 1 with the maximum coverage is selected, and the incident angle sets of cluster 1 to cluster 3 of all commercial user sets at eNB1 and eNB2 are estimated as {20, 0}/{−20, 0}, {0, 10}/{0, 10} and {20, 0}/{−20, 0} and the corresponded RSRP and the like, and the scenario type is determined to be a commercial users-evenly-horizontally-distributed scenario according to the user distribution situation.

In step 3, according to the determined commercial users-evenly-horizontally-distributed scenario, a default broadcast beam weight combination is selected respectively for both the cell eNB1 and the cell eNB2 in the region, and the numbers of users of all cells and KPIs reflecting system performance at the moment are counted, including the number of RRC connected users of 300, the access success rate of 99.9%, and the average CQI reporting value of 8.5.

In step 4, according to the user distribution situation, all weight combinations are traversed and all the change situations of the user receiving power and the size of the interference from neighboring cells under the combination are calculated, the SINR of all users under full system load is counted, and the objective function reflecting the optimal system may be designed as $F(x, y)=0.5*$the number of RRC connected users $(x, y)+0.5*\Sigma_{i=1}^{N}S/NR_{x,y}(i)$, where N represents the number of all connected users in the region, and x and y respectively represent the broadcast beam weight indices of the two cells, corresponding to the above set list. On the basis of the principle of the maximum objective function, the indices for selecting the optimal broadcast beam weights for eNB1 and eNB2 are (index 3, index 4).

In step 5, the indices applied of the above optimal broadcast beam weight combination are (index 3, index 4) specifically shown in FIG. 7D, the KPI at the moment is recorded including the number of RRC connected users of 200, the access success rate of 100% and the average CQI reporting value of 10. The KPI is compared with the KPI recorded of the previous default broadcast beam weight combination, it can be seen that the CQI indicator indicating the downlink signal quality of the terminal receiving base station and the access success rate are improved, therefore, the optimal weight is valid, the scenario maintains the application of the weight, and replaces the weight with the default broadcast beam weight combination of the subsequent commercial users-distributed-vertically-evenly scenario.

At the moment, a new broadcast beam weight combination is obtained through adaptive calculation according to the base station and the user distribution situation, and compared with the default broadcast beam weight combination, the combination effectively improves the system performance.

Example Four

Figure 8A:
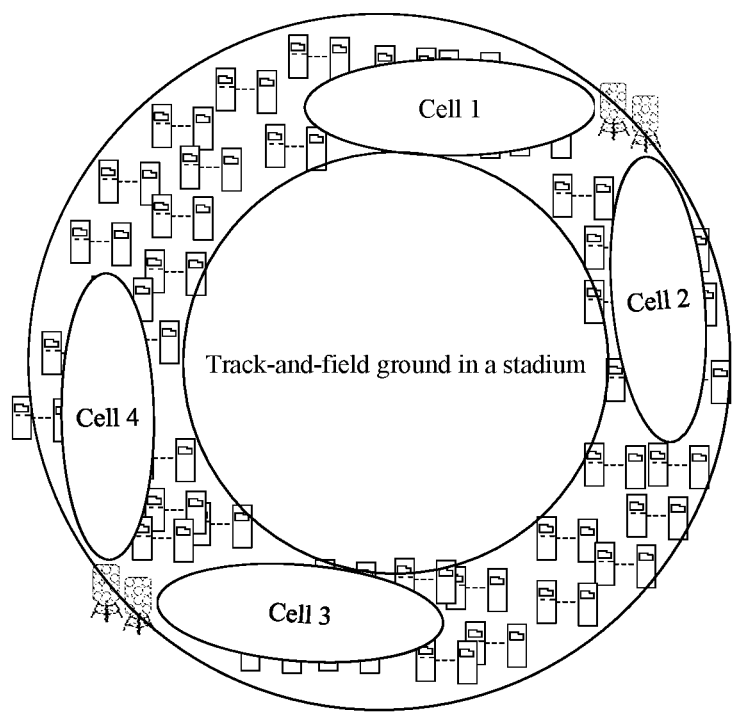
FIG. 8A is a schematic view of user distribution and cells of a stadium according to an embodiment of the present disclosure.

A stadium scenario is covered by four cells, and the schematic view of the specific scenario coverage may be shown in FIG. 8A. It is assumed that the region belongs to a ball game scenario, where users are evenly distributed in a stand region, specifically corresponding to the annular region in FIG. 8A (the annular region is a track-and-field ground in the stadium). After the distribution of the number of users is determined, an adaptive broadcast beam weight adjustment method is started, and an optional broadcast beam weight set is specifically shown in the table described below.

| Index | Horizontal orientation | Horizontal width of the broadcast beam | Downward inclination angle | Vertical width of the broadcast beam |
|---|---|---|---|---|
| 1 | 0 | 65 | 0 | 40 |
| 2 | 0 | 65 | 0 | 10 |
| 3 | 0 | 40 | 3 | 20 |
| 4 | 0 | 40 | 6 | 20 |
| 5 | 0 | 40 | 9 | 20 |
| 6 | 20 | 40 | 3 | 20 |
| 7 | 20 | 40 | 6 | 20 |
| 8 | 20 | 40 | 9 | 20 |
| 9 | −20 | 40 | 3 | 20 |
| 10 | −20 | 40 | 6 | 20 |
| 11 | −20 | 40 | 9 | 20 |

The example illustrates the broadcast beam weight determination method taking a stadium as an example, which may include the steps described below.

Figure 8B:
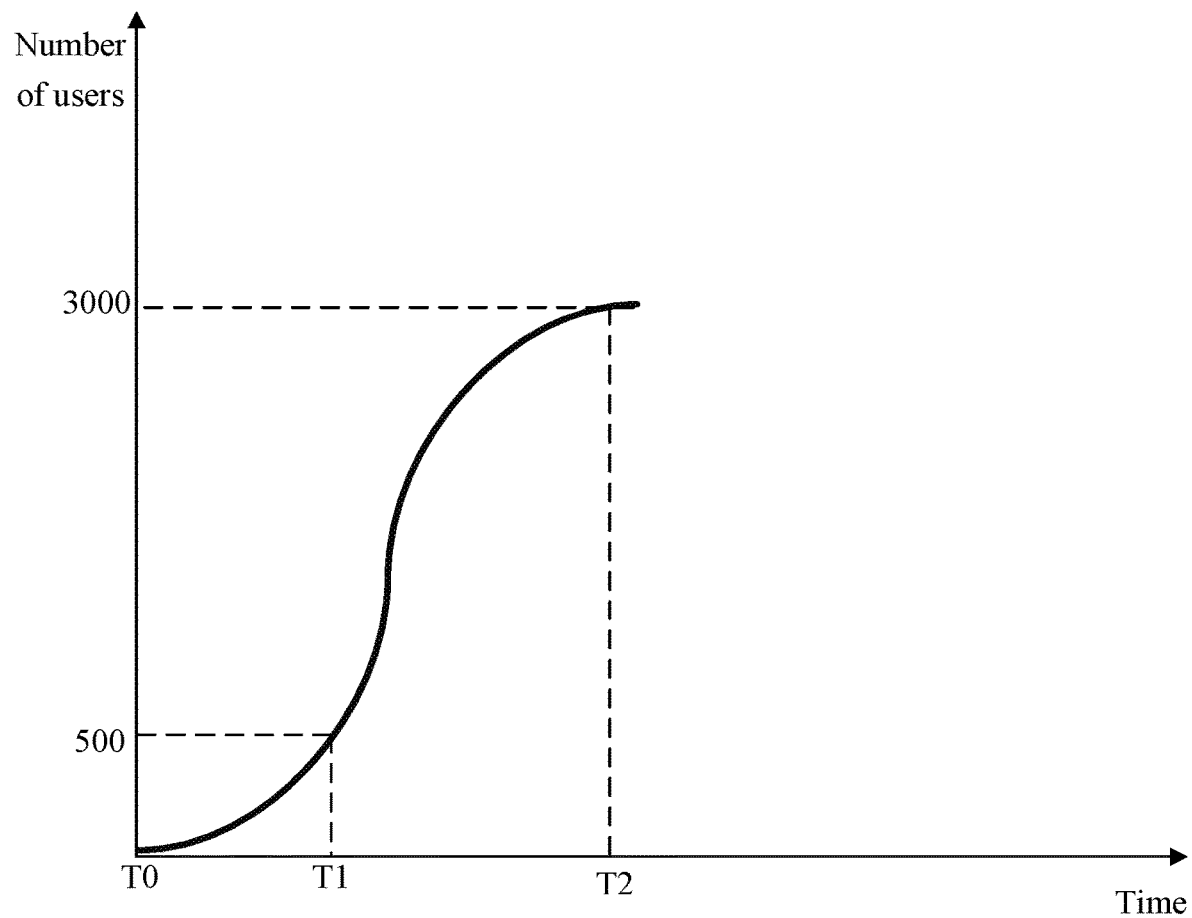
FIG. 8B is a schematic view illustrating a variation trend of a number of users on a time axis according to an embodiment of the present disclosure.

In step 1, it is assumed that the number of users in the stadium changes over time, which is shown in FIG. 8B, the time window is counted as 1 minute, the threshold of the number of users is 500, the threshold of changes in the number of users is 5%, it can be seen that in the example, audience entry time is T0, the threshold of the number of users is satisfied at T1, observation to the previous and late time windows is started and the proportion of the changes in the number of users is less than 1%, and the change in the number of users satisfies the threshold of change in the number of users at T2, so that the condition of starting the adaptive adjustment is met, and the subsequent steps are triggered.

In step 2, at the moment, (0, 65, 0, 40) corresponding to the weight combination index 1 with the maximum coverage is simultaneously selected by region 1 to region 4, and the horizontal incident angle and the vertical incident angle and RSRP sets of all commercial user sets in regions are respectively estimated as $\{\theta_{uei}^{cellj}, \varphi_{uei}^{cellj}, RSRP_{uei}^{cellj}\}$, where $\theta_{uei}^{cellj}$ represents an estimated value of the horizontal incident angle of the i-th user equipment (UE) in the j-th cell, $\varphi_{uei}^{cellj}$ represents an estimated value of the vertical incident angle of the i-th UE in the j-th cell, and $RSRP_{uei}^{cellj}$ represents an RSRP measurement reporting value of the i-th UE in the j-th cell; the value of i ranges from 1 to the number N of access users of all cells; and the value of j is the cell number value from 1 to 4, and cellj is the cell j. The scenario type may be determined to be a stadium ball game scenario according to the user distribution situation.

In step 3, according to the determined stadium ball game scenario, a default broadcast beam weight combination is selected respectively for all the cells of cell 1 to cell 4 in the region, and the numbers of users of all cells and KPIs reflecting system performance at the moment are counted, including the number of RRC connected users of 2780, the access success rate of 99.2%, the switching success rate of 98.5% and the average CQI reporting value of 7.7.

In step 4, according to the user distribution situation, all weight combinations are traversed and all the change situations of the user receiving power and the size of the interference from neighboring cells under the combination are calculated, the SINR of all users under full system load is counted, and the objective function reflecting the optimal system may be designed as $F(x, y, z, \upsilon)=0.3*N(x, y, z, \upsilon+0.7)*\Sigma_{i=1}^{N} SINR_{x,y,z,\upsilon}(i)$, where N represents the number of all connected users in the region, and x, y, z and $\upsilon$ respectively represent the broadcast beam weight indices of the four cells, corresponding to the above set list. On the basis of the principle of the maximum objective function, the indices for selecting the optimal broadcast beam weights for cell 1 to cell 4 are (index 10, index 6, index 11, index 7).

In step 5, the indices applied of the above optimal broadcast beam weight combination are (index 10, index 6, index 11, index 7), the KPI at the moment is recorded including the number of RRC connected users of 3000, the access success rate of 99.5%, the switching success rate of 99.1% and the average CQI reporting value of 8.9. The KPI is compared with the KPI recorded of the previous default broadcast beam weight combination, it can be seen that the CQI indicator indicating the downlink signal quality of the terminal receiving base station and the access success rate are obviously improved, therefore, the optimal broadcast beam weight combination is valid, the scenario maintains the application of the broadcast beam weight combination, and replaces the weight with the default broadcast beam weight combination of the subsequent commercial stadium ball game scenario.

At the moment, a new broadcast beam weight combination is obtained through adaptive calculation according to the base station and the user distribution situation, and compared with the default broadcast beam weight combination, the combination effectively improves the system performance.

Figure 9:
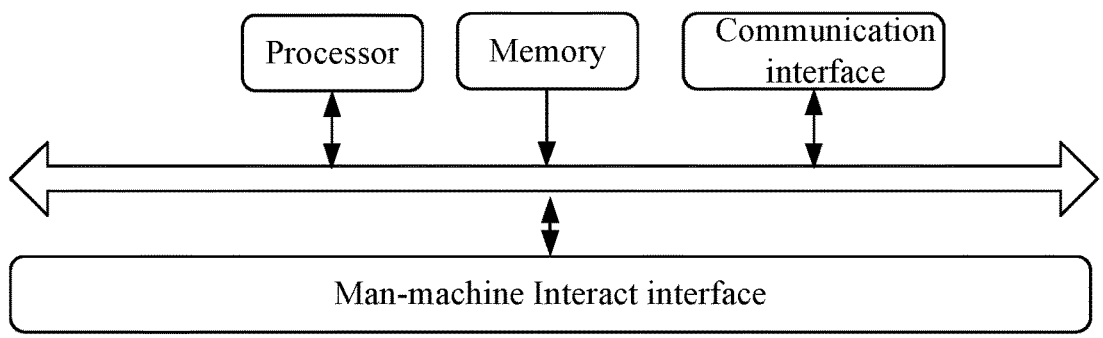
FIG. 9 is a structural diagram of a broadcast beam weight determination network element according to an embodiment of the present disclosure.

As shown in FIG. 9, a broadcast beam weight determination network element provided by the embodiment includes a transceiver, a memory and a processor.

The transceiver is configured to perform information interaction with a base station.

The memory is configured to store information.

The processor is separately connected to the transceiver and the memory, and configured to control information interaction between the transceiver and the access network element and the information storage of the memory by executing a computer-executable instruction and to implement the broadcast beam weight determination method provided by one or more solutions described above. For example, the broadcast beam weight determination method shown in FIGS. 1 to 3 and FIG. 5 may be implemented.

The memory may be various types of memories, and may be a random access memory, a read-only memory, a flash memory, etc. The memory may be configured to store information, for example, a computer-executable instruction, etc. The computer-executable instruction may be various program instructions, for example, object program instructions and/or source program instructions, etc.

The processor may be various types of processors, for example, a central processor, a microprocessor, a digital signal processor, a programmable array, an application specific integrated circuit, or an image processor.

The processor may be connected to the memory through a bus. The bus may be an integrated circuit, etc.

In some embodiments, the transceiver may include a communications interface, where the communications interface may include a network interface, such as a local area network interface, a transceiving antenna, etc. The communications interface is also connected to the processor and may be used for information transceiving.

In some embodiments, the broadcast beam weight determination network element further includes a human-machine interaction interface, where for example, the human-machine interaction interface may include various input and output devices, such as a keyboard, a touch screen, etc.

The broadcast beam weight determination network element in the embodiments of the present disclosure may be a network element of an access network, or a network element of a core network or an operation and maintenance management server of an operation and maintenance management system and the like.

A computer storage medium provided by the embodiment is configured to store a computer-executable instruction, where after the computer-executable instruction is executed, the broadcast beam weight determination method provided by one or more embodiments described above is capable of being implemented.

The computer storage medium includes: a removable storage equipment, a read-only memory (ROM), a random access memory (RAM), a magnetic disk, an optical disk or another medium capable of storing program codes. In some embodiments, the storage medium may be a non-transitory storage medium.

Figure 10:
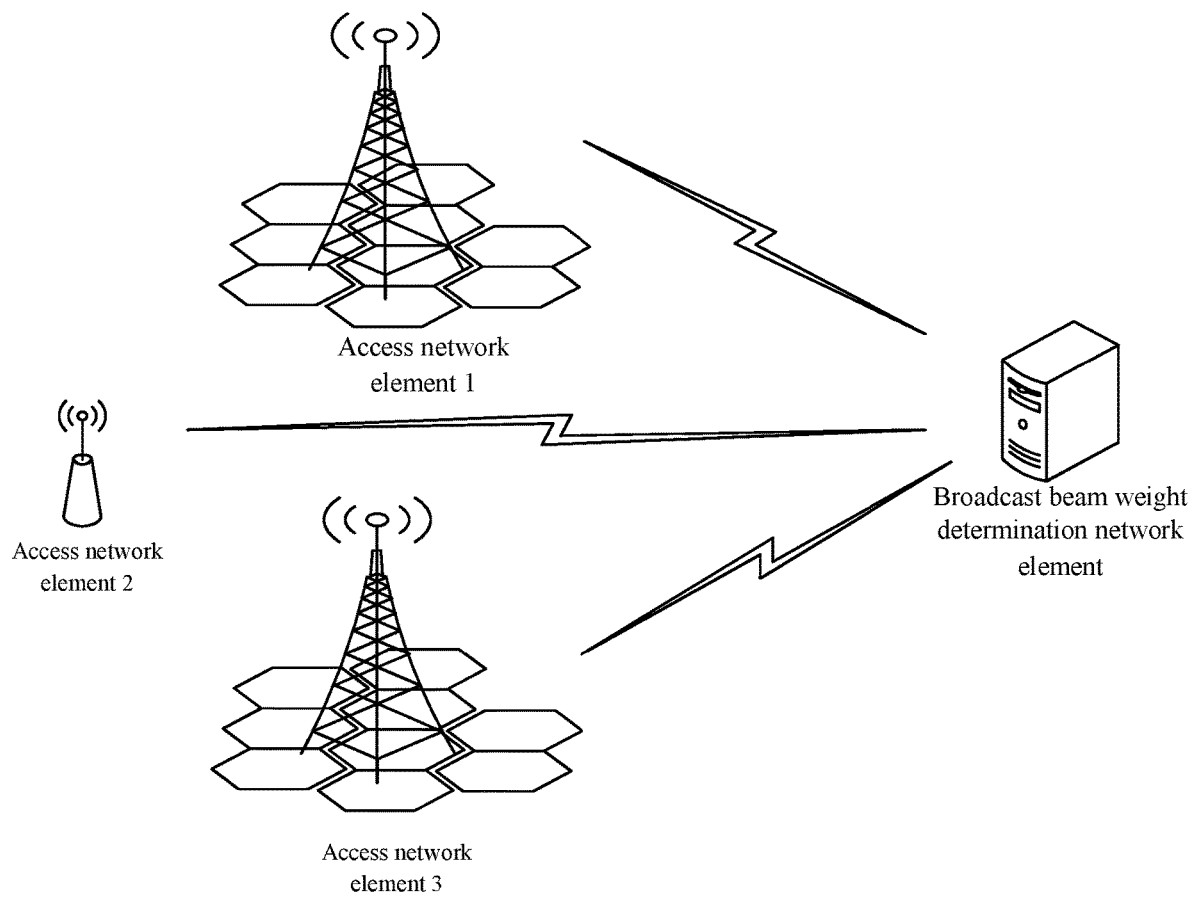
FIG. 10 is a structural view of a communications system according to an embodiment of the present disclosure.

As shown in FIG. 10, a communications system provided by the embodiment includes an access network element and an adaptive adjustment network element for adjusting a broadcast beam weight.

The access network element is configured to collect user distribution information.

The adaptive adjustment network element for adjusting a broadcast beam weight is connected to the access network element for receiving the user distribution information and implementing the broadcast beam weight determination method provided by one or more embodiments described above according to the user distribution information. For example, the broadcast beam weight determination method shown in FIGS. 1 to 3 and FIG. 5 may be implemented. In the embodiment, the broadcast beam weight determination network element may implement at least the following operations through the execution of the computer-executable instruction: determining a predicted performance indicator corresponding to the broadcast beam weight combination according to the user distribution information of users in the region; determining a first broadcast beam weight combination corresponding to the optimal predicted performance indicator; and switching a second broadcast beam weight combination in the region to the first broadcast beam weight combination.

The access network element may be various types of access devices and may be used to access a network, for example, a wireless network, where the access network element may include access devices such as various types of base stations, relay nodes and the like. The access network elements shown in FIG. 10 include access network element 1, access network element 2 and access network element 3. During specific implementation, the number of the access network elements connected to a same broadcast beam weight determination network element is not limited to three.

The broadcast beam weight determination network element may be connected to the access network element through various connection methods, for example, a connection between the access network element, through backhaul, and the broadcast beam weight determination network element may for example, be established through a tunnel. The broadcast beam weight determination network element described in the embodiment may be disposed on a same physical communications equipment as other network elements, for example, disposed on various types of gateways, mobile management entities or access control functions, or the broadcast beam weight determination network element is a newly introduced special network element. The broadcast beam weight determination network element may be located in an access network, a core network or a background management service system.

It should be understood that the devices and the methods disclosed in the embodiments of the present disclosure may be implemented in other manners. The equipment embodiments described above are only illustrative. For example, the division of units is only a division of logical functions, and, in practice, the division of units may be implemented in other manners. For example, multiple units or components may be combined or may be integrated into another system, or some features may be omitted or not executed. In addition, coupling, direct coupling or communications connections between the presented or discussed components may be indirect coupling or communications connections via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to practical needs to achieve the objects of the solutions in the embodiments.

In addition, various function units in the embodiments of the present disclosure may all be integrated in one processing module, or each unit may be used as a separate unit, or two or more units may be integrated into one unit. The integrated unit may be implemented by hardware or may be implemented by hardware plus a software function unit.

It should be understood by those skilled in the art that all or part of the steps in the method embodiments described above may be implemented by hardware instructed by relevant programs, these programs may be stored in a computer-readable storage medium and, when executed, these programs execute steps included in the method embodiments described above; and the preceding storage medium includes: a mobile storage device, a ROM, a RAM, a magnetic disk, an optical disk or another medium capable of storing program codes.

The above are only specific embodiments of the present disclosure and are not intended to limit the scope of the present disclosure. Within the technical scope disclosed by the present disclosure, any change or substitution easily conceivable to those skilled in the art should fall within the protection scope of the present disclosure. Therefore, the protection scope of the present disclosure is subject to the protection scope of the claims.

What is claimed is:

1. A broadcast beam weight determination method, comprising:
   determining a predicted performance indicator corresponding to a candidate broadcast beam weight combination according to user information of a region;
   determining a first broadcast beam weight combination corresponding to an optimal predicted performance indicator; and
   applying the first broadcast beam weight combination, wherein the determining the predicted performance indicator corresponding to the candidate broadcast beam weight combination according to the user information of the region comprises:
   calculating the predicted performance indicator corresponding to the candidate broadcast beam weight combination by using an objective function and taking the user information as an input; and
   wherein the method further comprises: selecting the objective function according to a predetermined performance criterion.

2. The method according to claim 1, wherein the user information comprises at least one of:
   a number of users;
   information about user distribution and location;
   a number of users using broadcast beams corresponding to different broadcast beam weights;
   a direction of signal arrival (DOA) of a broadcast beam used by a user or a user set, wherein the DOA comprises: a horizontal DOA and/or a vertical DOA, and the user set comprises at least two users;
   user receiving power of a broadcast beam used by a user or a user set;
   a signal-to-interference-plus-noise ratio (SINK) of a broadcast beam used by a user or a user set; or
   neighboring cell interference information of a broadcast beam used by a user or a user set.

3. The method according to claim 2, wherein the selecting the objective function according to the predetermined performance criterion comprises at least one of:
   selecting the objective function according to a maximum throughput criterion of the region;
   selecting the objective function according to a criterion of a maximum number of users of the region; or
   selecting the objective function according to a maximum throughput criterion, a first weight of a maximum throughput, a criterion of a maximum number of users and a second weight of the criterion of the maximum number of users.

4. The method according to claim 2, wherein the calculating the predicted performance indicator corresponding to the candidate broadcast beam weight combination by using the objective function and taking the user information as the input comprises at least one of:
   calculating the predicted performance indicator according to the number of users using the broadcast beams corresponding to the different broadcast beam weights in the region and SINRs of the broadcast beams corresponding to the different broadcast beam weights;
   calculating the predicted performance indicator according to the number of users using the broadcast beams corresponding to the different broadcast beam weights, SINRs of the broadcast beams corresponding to the different broadcast beam weights and neighboring cell interference values of the broadcast beams corresponding to the different broadcast beam weights; or
   determining a broadcast beam corresponding to a broadcast beam weight covering the user and received signal power or a SINR according to at least one of the information about user distribution and location, the number of users using the broadcast beams corresponding to the different broadcast beam weights or the DOA of the broadcast beam used by the user or the user set.

5. The method according to claim 2, further comprising:
   determining, according to the number of users in the region, whether to start a broadcast beam weight determination before determining the predicted performance indicator corresponding to a broadcast beam weight combination;
   wherein the determining, according to the number of users in the region, whether to start a broadcast beam weight determination comprises at least one of:
   in response to the number of users being greater than a first number threshold and a number change amount between user data in a current time window and user data in a previous time window being maintained within a second preset range, starting the broadcast beam weight determination; or
   in response to the number of users being greater than a first number threshold and a ratio of a number change amount to the number of users being in a third preset range, starting the broadcast beam weight determination.

6. The method according to claim 5, further comprising:
   applying a second broadcast beam weight combination according to a scenario type corresponding to the region before applying the first broadcast beam weight combination;
   wherein the method further comprises:
   acquiring an actual performance indicator of the first broadcast beam weight combination; and
   in response to a difference between the actual performance indicator of the first broadcast beam weight combination and the optimal predicted performance indicator being out of a first preset range, recovering the second broadcast beam weight combination; and
   in response to the difference between the actual performance indicator and the optimal predicted performance indicator being in the first preset range, controlling the region to continuous to use the first broadcast beam weight combination.

7. The method according to claim 2, further comprising:
   receiving the user information from an access network element of the region; and
   sending an application instruction of the first broadcast beam weight combination to the access network element.

8. The method according to claim 1, wherein the selecting the objective function according to the predetermined performance criterion comprises at least one of:
   selecting the objective function according to a maximum throughput criterion of the region;
   selecting the objective function according to a criterion of a maximum number of users of the region; or
   selecting the objective function according to a maximum throughput criterion, a first weight of a maximum throughput, a criterion of a maximum number of users and a second weight of the criterion of the maximum number of users.

9. The method according to claim 1, wherein the calculating the predicted performance indicator corresponding to the candidate broadcast beam weight combination by using the objective function and taking the user information as the input comprises at least one of:
calculating the predicted performance indicator according to the number of users using the broadcast beams corresponding to the different broadcast beam weights in the region and SINRs of the broadcast beams corresponding to the different broadcast beam weights;
calculating the predicted performance indicator according to the number of users using the broadcast beams corresponding to the different broadcast beam weights, SINRs of the broadcast beams corresponding to the different broadcast beam weights and neighboring cell interference values of the broadcast beams corresponding to the different broadcast beam weights; or
determining a broadcast beam corresponding to a broadcast beam weight covering the user and received signal power or a SINR according to at least one of the information about user distribution and location, the number of users using the broadcast beams corresponding to the different broadcast beam weights or the DOA of the broadcast beam used by the user or the user set.

10. The method according to claim 1, further comprising:
determining, according to the number of users in the region, whether to start a broadcast beam weight determination before determining the predicted performance indicator corresponding to a broadcast beam weight combination;
wherein the determining, according to the number of users in the region, whether to start a broadcast beam weight determination comprises at least one of:
in response to the number of users being greater than a first number threshold and a number change amount between user data in a current time window and user data in a previous time window being maintained within a second preset range, starting the broadcast beam weight determination; or
in response to the number of users being greater than a first number threshold and a ratio of a number change amount to the number of users being in a third preset range, starting the broadcast beam weight determination.

11. The method according to claim 10, further comprising:
applying a second broadcast beam weight combination according to a scenario type corresponding to the region before applying the first broadcast beam weight combination;
wherein the method further comprises:
acquiring an actual performance indicator of the first broadcast beam weight combination; and
in response to a difference between the actual performance indicator of the first broadcast beam weight combination and the optimal predicted performance indicator being out of a first preset range, recovering the second broadcast beam weight combination; and
in response to the difference between the actual performance indicator and the optimal predicted performance indicator being in the first preset range, controlling the region to continuous to use the first broadcast beam weight combination.

12. The method according to claim 1, further comprising:
receiving the user information from an access network element of the region; and
sending an application instruction of the first broadcast beam weight combination to the access network element.

13. A broadcast beam weight determination apparatus, comprising:
a first determination module, which is configured to determine a predicted performance indicator corresponding to a candidate broadcast beam weight combination according to user information of a region;
a second determination module, which is configured to determine a first broadcast beam weight combination corresponding to an optimal predicted performance indicator; and
an application module, which is configured to apply the first broadcast beam weight combination, wherein the first determination module is configured to calculate the predicted performance indicator corresponding to the candidate broadcast beam weight combination by using an objective function and taking the user information as an input; and
wherein the apparatus further comprises: a selection module, which is configured to select the objective function according to a predetermined performance criterion.

14. The apparatus according to claim 13, wherein the user information comprises at least one of:
a number of users;
information about user distribution and location;
a number of users using broadcast beams corresponding to different broadcast beam weights;
a direction of signal arrival (DOA) of a broadcast beam used by a user or a user set, wherein the DOA comprises: a horizontal DOA and/or a vertical DOA, and the user set comprises at least two users;
user receiving power of a broadcast beam used by a user or a user set;
a signal-to-interference-plus-noise ratio (SINK) of a broadcast beam used by a user or a user set; or
neighboring cell interference information of a broadcast beam used by a user or a user set.

15. The apparatus according to claim 14, wherein the selection module is configured to execute at least one of:
selecting the objective function according to a maximum throughput criterion of the region;
selecting the objective function according to a criterion of a maximum number of users of the region; or
selecting the objective function according to a maximum throughput criterion, a first weight value of a maximum throughput, a criterion of a maximum number of users and a second weight of the criterion of the maximum number of users.

16. The apparatus according to claim 15, wherein the first determination module is configured to execute at least one of:
calculating the predicted performance indicator according to the number of users using the broadcast beams corresponding to the different broadcast beam weights in the region and SINRs of the broadcast beams corresponding to the different broadcast beam weights;
calculating the predicted performance indicator according to the number of users using the broadcast beams corresponding to the different broadcast beam weights, SINRs of the broadcast beams corresponding to the different broadcast beam weights and neighboring cell interference values of broadcast beams corresponding to the different broadcast beam weights; or determining a broadcast beam corresponding to a broadcast beam weight covering the user and received signal power or a SINR according to at least one of the information about user distribution and location, the number of users using the broadcast beams corresponding to the different broadcast beam weights or the DOA of the broadcast beam used by the user or the user set.

17. The apparatus according to claim 14, further comprising:

a third determination module, which is configured to determine according to the number of users in the region whether to start a broadcast beam weight determination before the predicted performance indicator corresponding to a broadcast beam weight combination is determined;

wherein the first determination module is configured to execute at least one of:

in response to the number of users being greater than a first number threshold and a number change amount between user data in a current time window and user data in a previous time window being maintained within a second preset range, starting the broadcast beam weight determination; or in response to the number of users being greater than a first number threshold and a ratio of a number change amount to the number of users being in a third preset range, starting the broadcast beam weight determination.

18. The apparatus according to claim 17, further comprising:

a fourth determination module, which is configured to apply a second broadcast beam weight combination according to a scenario type corresponding to the region before the first broadcast beam weight combination is applied;

a first acquisition module, which is configured to acquire an actual performance indicator of the first broadcast beam weight combination;

a recovery module, which is configured to recover a second broadcast beam weight combination in response to a difference between the actual performance indicator of the first broadcast beam weight combination and the optimal predicted performance indicator being out of a first preset range; and an application module, which is configured to control the region to continuous to use the first broadcast beam weight combination in response to the difference between the actual performance indicator and the optimal predicted performance indicator being in the first preset range.

19. The apparatus according to claim 14, further comprising:

a receiving module, which is configured to receive the user information from an access network element of the region; and a sending module, which is configured to send an application instruction of the first broadcast beam weight combination to the access network element.

20. The apparatus according to claim 13, wherein the selection module is configured to execute at least one of:

selecting the objective function according to a maximum throughput criterion of the region;

selecting the objective function according to a criterion of a maximum number of users of the region; or selecting the objective function according to a maximum throughput criterion, a first weight value of a maximum throughput, a criterion of a maximum number of users and a second weight of the criterion of the maximum number of users.

21. The apparatus according to claim 20, wherein the first determination module is configured to execute at least one of:

calculating the predicted performance indicator according to the number of users using the broadcast beams corresponding to the different broadcast beam weights in the region and SINRs of the broadcast beams corresponding to the different broadcast beam weights;

calculating the predicted performance indicator according to the number of users using the broadcast beams corresponding to the different broadcast beam weights, SINRs of the broadcast beams corresponding to the different broadcast beam weights and neighboring cell interference values of broadcast beams corresponding to the different broadcast beam weights; or determining a broadcast beam corresponding to a broadcast beam weight covering the user and received signal power or a SINR according to at least one of the information about user distribution and location, the number of users using the broadcast beams corresponding to the different broadcast beam weights or the DOA of the broadcast beam used by the user or the user set.

22. The apparatus according to claim 13, further comprising:

a third determination module, which is configured to determine according to the number of users in the region whether to start a broadcast beam weight determination before the predicted performance indicator corresponding to a broadcast beam weight combination is determined;

wherein the first determination module is configured to execute at least one of:

in response to the number of users being greater than a first number threshold and a number change amount between user data in a current time window and user data in a previous time window being maintained within a second preset range, starting the broadcast beam weight determination; or in response to the number of users being greater than a first number threshold and a ratio of a number change amount to the number of users being in a third preset range, starting the broadcast beam weight determination.

23. The apparatus according to claim 22, further comprising:

a fourth determination module, which is configured to apply a second broadcast beam weight combination according to a scenario type corresponding to the region before the first broadcast beam weight combination is applied;

a first acquisition module, which is configured to acquire an actual performance indicator of the first broadcast beam weight combination;

a recovery module, which is configured to recover a second broadcast beam weight combination in response to a difference between the actual performance indicator of the first broadcast beam weight combination and the optimal predicted performance indicator being out of a first preset range; and an application module, which is configured to control the region to continuous to use the first broadcast beam weight combination in response to the difference between the actual performance indicator and the optimal predicted performance indicator being in the first preset range.

24. The apparatus according to claim 13, further comprising:
- a receiving module, which is configured to receive the user information from an access network element of the region; and
- a sending module, which is configured to send an application instruction of the first broadcast beam weight combination to the access network element.

25. A broadcast beam weight determination network element, comprising:
- a transceiver, which is configured to perform information interaction with an access network element;
- a memory, which is configured to store information; and
- a processor, which is separately connected to the transceiver and the memory, and configured to control the information interaction between the transceiver and the access network element and the information storage of the memory by executing a computer-executable quality and to implement the method of claim 1.

26. A non-transitory computer storage medium, which is configured to store a computer-executable instruction, wherein after the computer-executable instruction is executed, the method of claim 1 is capable of being implemented.

27. A communications system, comprising:
- an access network element, which is configured to collect user information; and
- an adaptive adjustment network element for adjusting a broadcast beam weight, which is connected to the access network element for receiving the user information and implementing the broadcast beam weight determination method of claim 1 according to user distribution information.

* * * * *